(12) United States Patent
Arima

(10) Patent No.: US 6,859,121 B2
(45) Date of Patent: Feb. 22, 2005

(54) OPTICAL DEFLECTOR AND ELECTROMAGNETIC ACTUATOR

(75) Inventor: Michitsugu Arima, Kamiina-gun (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/391,220

(22) Filed: Mar. 18, 2003

(65) Prior Publication Data

US 2003/0174035 A1 Sep. 18, 2003

(30) Foreign Application Priority Data

Mar. 18, 2002 (JP) ........................................ 2002-075047

(51) Int. Cl.[7] .............................................. H01H 51/22
(52) U.S. Cl. ........................................ 335/78; 359/224
(58) Field of Search ................... 335/78; 359/223–225, 359/290, 291, 298

(56) References Cited

U.S. PATENT DOCUMENTS

| | | | | |
|---|---|---|---|---|
| 4,421,381 A | * | 12/1983 | Ueda et al. ................. | 359/214 |
| 5,912,608 A | | 6/1999 | Asada | |
| 6,188,504 B1 | * | 2/2001 | Murakami et al. .......... | 359/224 |
| 6,467,345 B1 | * | 10/2002 | Neukermans et al. .... | 73/504.02 |
| 6,644,821 B2 | * | 11/2003 | Ikegame ...................... | 359/872 |
| 2002/0118429 A1 | * | 8/2002 | Miyajima et al. ........... | 359/224 |

FOREIGN PATENT DOCUMENTS

JP           2002323669 A    * 11/2002     ........... G02B/26/10

* cited by examiner

*Primary Examiner*—Lincoln Donovan
*Assistant Examiner*—Bernard Rojas
(74) *Attorney, Agent, or Firm*—Scully, Scott, Murphy & Presser

(57) ABSTRACT

The present invention is directed to an optical deflector. The optical deflector includes a support body, a movable plate, a pair of first elastic portions connecting the movable plate and the support body, a pair of second elastic portions connecting the movable plate and the support body, a first drive wiring extending through the support body, the first elastic portions and the movable plate, a second drive wiring extending through the support body, the second elastic portions and the movable plate, and a magnetic field generator. The movable plate has a reflecting surface to reflect a light beam. The first and second elastic portions are elastically deformable to allow the movable plate to rotate about first and second rotational axes, respectively. The first and second drive wirings include parts that are positioned in the movable plate and respectively extend in parallel with the first and second rotational axes.

12 Claims, 21 Drawing Sheets

OPTICAL DEFLECTOR AND ELECTROMAGNETIC ACTUATOR

CROSS-REFERENCE TO RELATED APPLICATIONS

This application is based upon and claims the benefit of priority from the prior Japanese Patent Application No. 2002-75047, filed Mar. 18, 2002, the entire contents of which are incorporated herein by reference.

BACKGROUND OF THE INVENTION

1. Field of the Invention

The present invention relates to an electromagnetic actuator, such as an optical deflector, which is electromagnetically driven.

2. Description of the Related Art

For the application to drive a relatively large mirror as typified by, e.g., an optical switch in the static and analog manner, an electromagnetic drive type optical deflector is superior to a static drive type element in the drive efficiency and controllability.

U.S. Pat. No. 5,912,608 discloses an optical deflector having a gimbal structure. FIG. 30 of the present application shows a deflecting mirror element such as that used in the optical deflector of U.S. Pat. No. 5,912,608.

As shown in FIG. 30, this deflecting mirror element comprises an inner movable plate 1101, an outer movable plate 1102 arranged on the outer side of the inner movable plate 1101, a support frame 1103 arranged on the outer side of the outer movable plate 1102, hinges 1104 connecting the inner movable plate 1101 and the outer movable plate 1102, and hinges 1105 connecting the outer movable plate 1102 and the support frame 1103.

This deflecting mirror element is located in a parallel magnetic field 1108 generated by external magnets (not shown). The inner movable plate 1101 includes a coil 1106 formed on it, and the outer movable plate 1102 includes a coil 1107 formed on it. A current flowing through the coil 1106 rotates the inner movable plate 1101 about a longitudinal axis of the hinges 1104 by the interaction of the parallel magnetic field 1108. Further, a current flowing through the coil 1107 rotates the outer movable plate 1102 about the longitudinal axis of the hinges 1105 by the interaction of the parallel magnetic field 1108.

The inner movable plate 1101 has a reflecting surface 1109 formed on it. The inner movable plate 1101 can be rotated solely or together with the outer movable plate 1102 at a desired angle by controlling the current flowing through the coil 1106 and the coil 1107. That is, a direction of the reflecting surface 1109 of the inner movable plate 1101 can be controlled. As a result, a direction of a light beam reflected by the reflecting surface 1109 can be arbitrarily adjusted.

In the optical deflector having the deflecting mirror element with the gimbal structure such as shown in FIG. 30, however, it is difficult to statically and independently drive each of the inner movable plate and the outer movable plate. That is, crosstalk occurs between the rotational operations corresponding to the respective rotational axes. Description will now be given as to this difficulty, namely, generation of the crosstalk with reference to FIG. 31.

In FIG. 31, a current flowing through the coil 1106 formed on the inner movable plate 1101 can be decomposed of two components, i.e., a current component 1110 and a current component 1111. The current component 1110 generates a couple 1115 that rotate the inner movable plate 1101 about the rotational axis 1120. The current component 1111 generates a couple 1116 that rotate the outer movable plate 1102 about the rotational axis 1121 through the hinge 1104.

Accordingly, when the current is caused to flow through the coil 1106 in order to drive the inner movable plate 1101, the outer movable plate 1102 is also rotated. Therefore, it is hard to independently rotate each of the inner movable plate 1101 and the outer movable plate 1102.

BRIEF SUMMARY OF THE INVENTION

The present invention is directed to an optical deflector. The optical deflector comprises a support body, a movable plate, a pair of first elastic portions connecting the movable plate and the support body, a pair of second elastic portions connecting the movable plate and the support body, a first drive wiring extending through the support body, the first elastic portions and the movable plate, a second drive wiring extending through the support body, the second elastic portions and the movable plate, and a magnetic field generator that generates a magnetic field in a space surrounding the movable plate. The movable plate has a reflecting surface to reflect a light beam. The first elastic portions are elastically deformable to allow the movable plate to rotate about a first rotational axis. The second elastic portions are elastically deformable to allow the movable plate to rotate about a second rotational axis orthogonal to the first rotational axis. The first drive wiring, which allows a current to flow through it, includes parts that are positioned in the movable plate and extend in parallel with the first rotational axis. The second drive wiring, which allows a current to flow through it, includes parts that are positioned in the movable plate and extend in parallel with the second rotational axis. The magnetic field generated by the magnetic field generator interacts with the currents flowing through the drive wirings to cause the movable plate to rotate, so that a direction of the light beam reflected by the reflecting surface of the movable plate is changed.

In the optical deflector according to the present invention, since the parts of the first drive wiring in the movable plate extend in parallel with the first rotational axis, a current flowing through the first drive wiring generates a force to rotate the movable plate about the first rotational axis but does not generate a force to rotate the movable plate about the second rotational axis orthogonal to the first rotational axis. Likewise, since the parts of the second drive wiring in the movable plate extend in parallel to the second rotational axis, a current flowing through the second drive wiring generates a force to rotate the movable plate about the second rotational axis but does not generate a force to rotate the movable plate about the first rotational axis orthogonal to the second rotational axis.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments according to the present invention will now be described hereinafter with reference to the accompanying drawings.

First Embodiment

A first embodiment according to the present invention is directed to an optical deflector, which can be substantially regarded as a set of optical deflectors.

Figure 1:
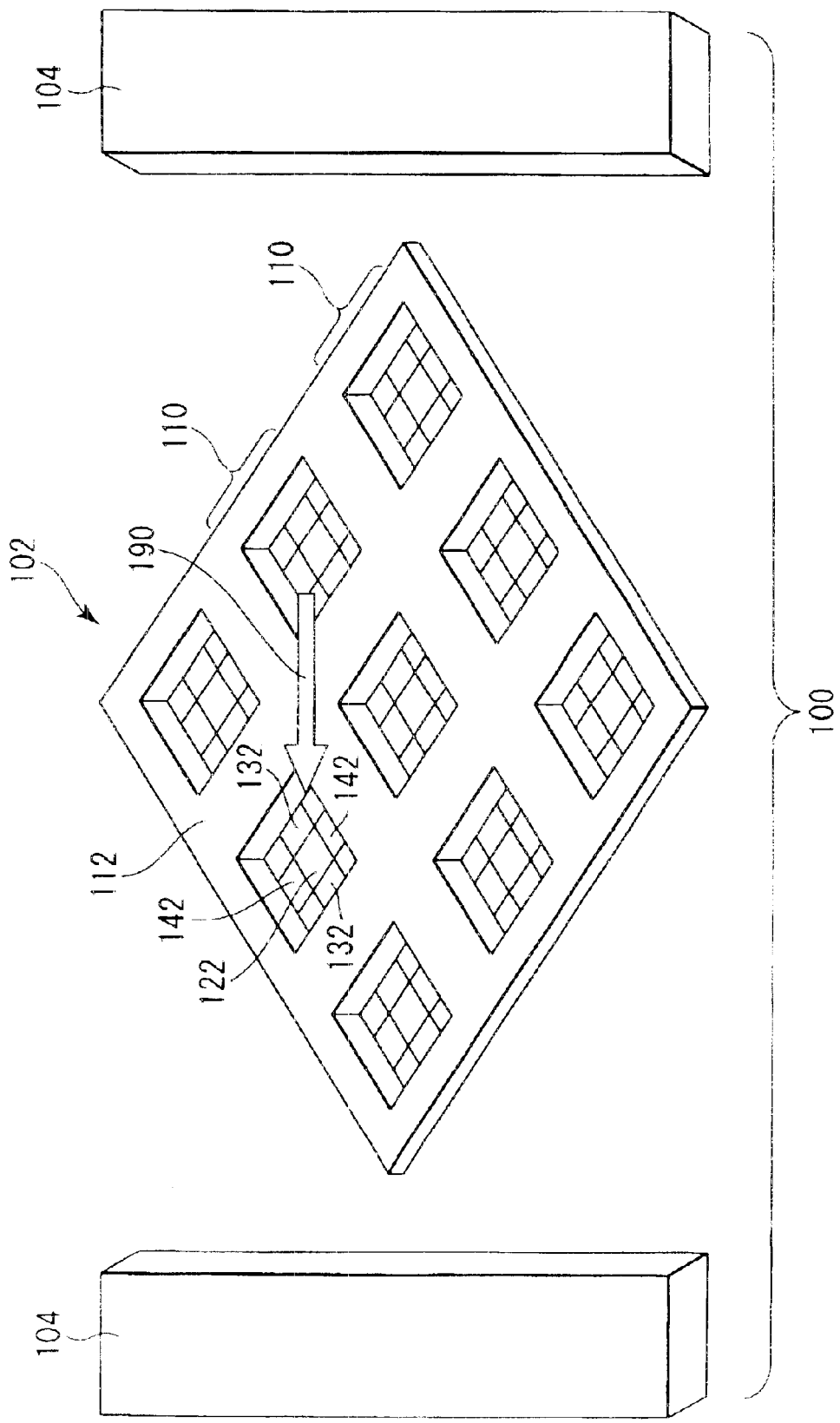
FIG. 1 shows an optical deflector according to a first embodiment of the present invention.

As shown in FIG. 1, an optical deflector 100 has a deflecting mirror element array 102 and a magnetic field generator that generates a magnetic field 190 in a space surrounding the deflecting mirror element array. In other words, the optical deflector 100 has the magnetic field generator that generates a parallel magnetic field 190 and the deflecting mirror element array 102 arranged in the parallel magnetic field 190.

The deflecting mirror element array 102 includes a plurality of deflecting mirror elements 110, e.g., nine deflecting mirror elements 110. The deflecting mirror elements 110 are regularly distanced from each other and positioned in the form of, e.g., a lattice.

The magnetic field generator comprises, e.g., a pair of permanent magnets 104. The permanent magnets 104 are arranged on both sides of the deflecting mirror element array. The permanent magnets are positioned along the diagonal line of the rectangular deflecting mirror element array 102.

Figure 2:
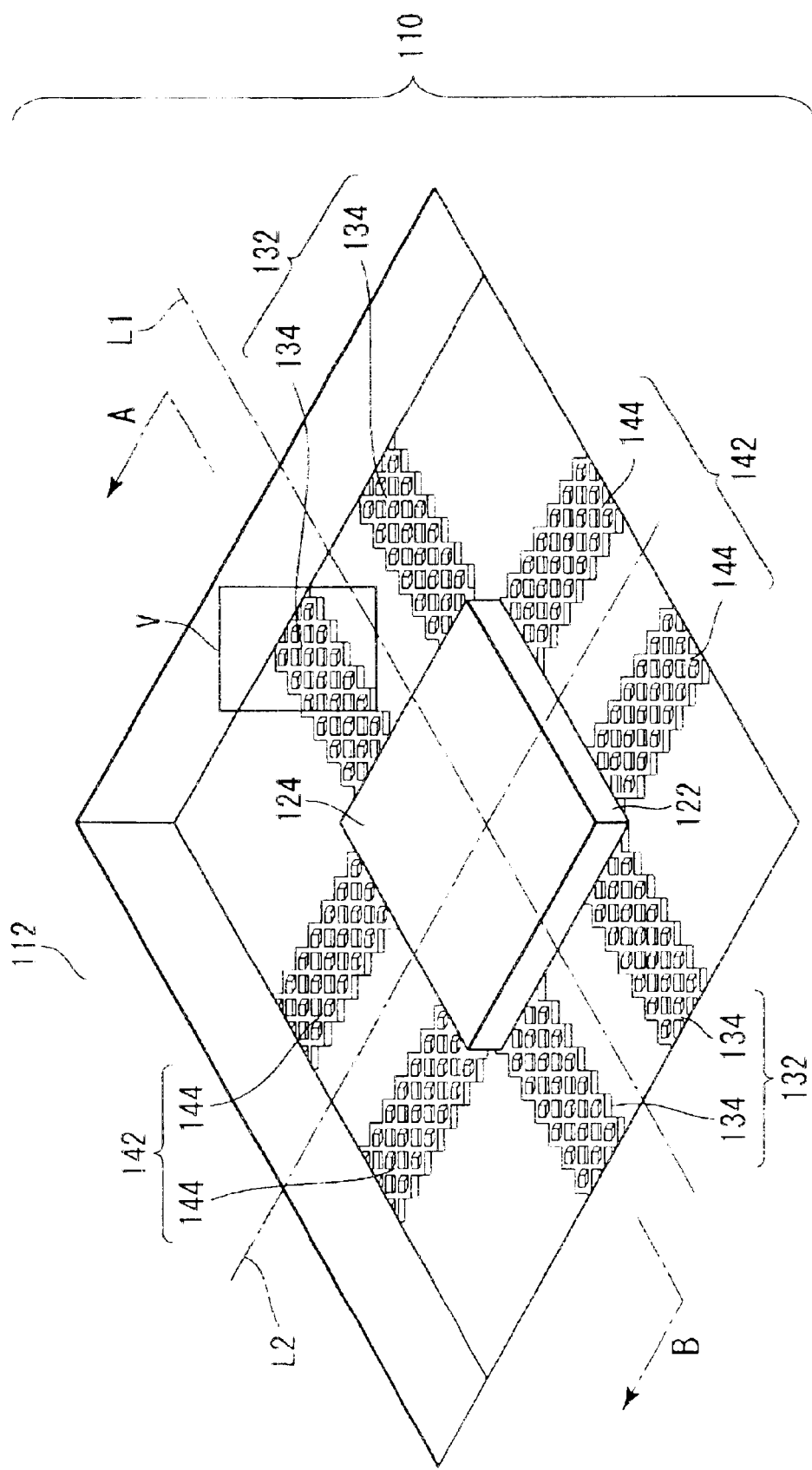
FIG. 2 shows one deflecting mirror element included in a deflecting mirror element array depicted in FIG. 1 in the enlarged manner.
Figure 3:
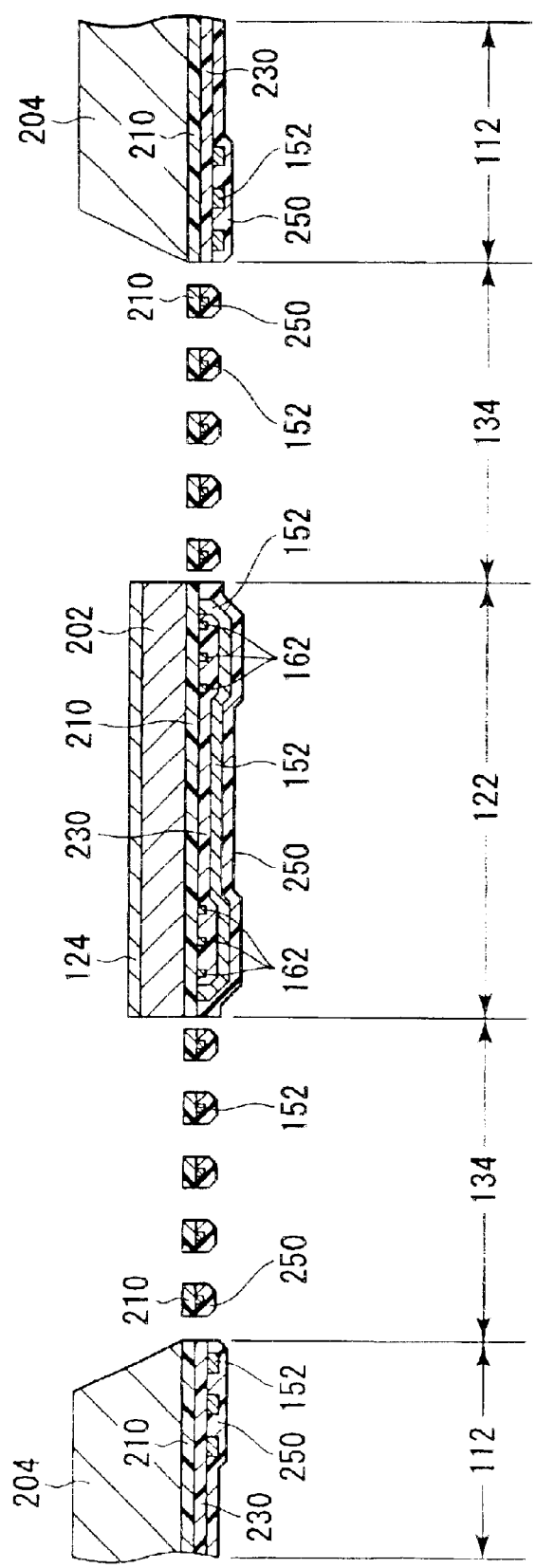
FIG. 3 shows a cross section of the deflecting mirror element depicted in FIG. 2 taken along the line A–B.

As shown in FIG. 2, each of the deflecting mirror elements 110 includes a movable plate 122, a support body 112 surrounding the movable plate 122, a pair of first elastic portions 132, which are elastically deformable, connecting the movable plate 122 and the support body 112, and a pair of second elastic portions 142, which are elastically deformable, connecting the movable plate 122 and the support body 112.

The support body 112 of an arbitrary deflecting mirror element 110 is continuous with the support body 112 of another deflecting mirror element 110. In other words, the support bodies 112 of the deflecting mirror elements 110 are integrally formed from a silicon substrate by an etching process.

The movable plate 122 has a reflecting surface 124 for reflecting a light beam on one side thereof.

The first elastic portions 132 support the movable plate 122 with respect to the support body 112 to allow the movable plate 122 to rotate about a first rotational axis $L_1$. Each of the first elastic portions 132 comprises a pair of elastic members 134 extending along the first rotational axis $L_1$.

The second elastic portions 142 support the movable plate 122 with respect to the support body 112 to allow the movable plate 122 to rotate about a second rotational axis $L_2$. Each of the second elastic portions 142 comprises a pair of elastic members 144 extending along the second rotational axis $L_2$.

The first rotational axis $L_1$ and the second rotational axis $L_2$ are orthogonal to each other. The magnetic field generator comprising the pair of permanent magnets 104 generates a magnetic field having a direction with an angle of 45° with respect to the first rotational axis $L_1$ and the second rotational axis $L_2$.

Figure 4:
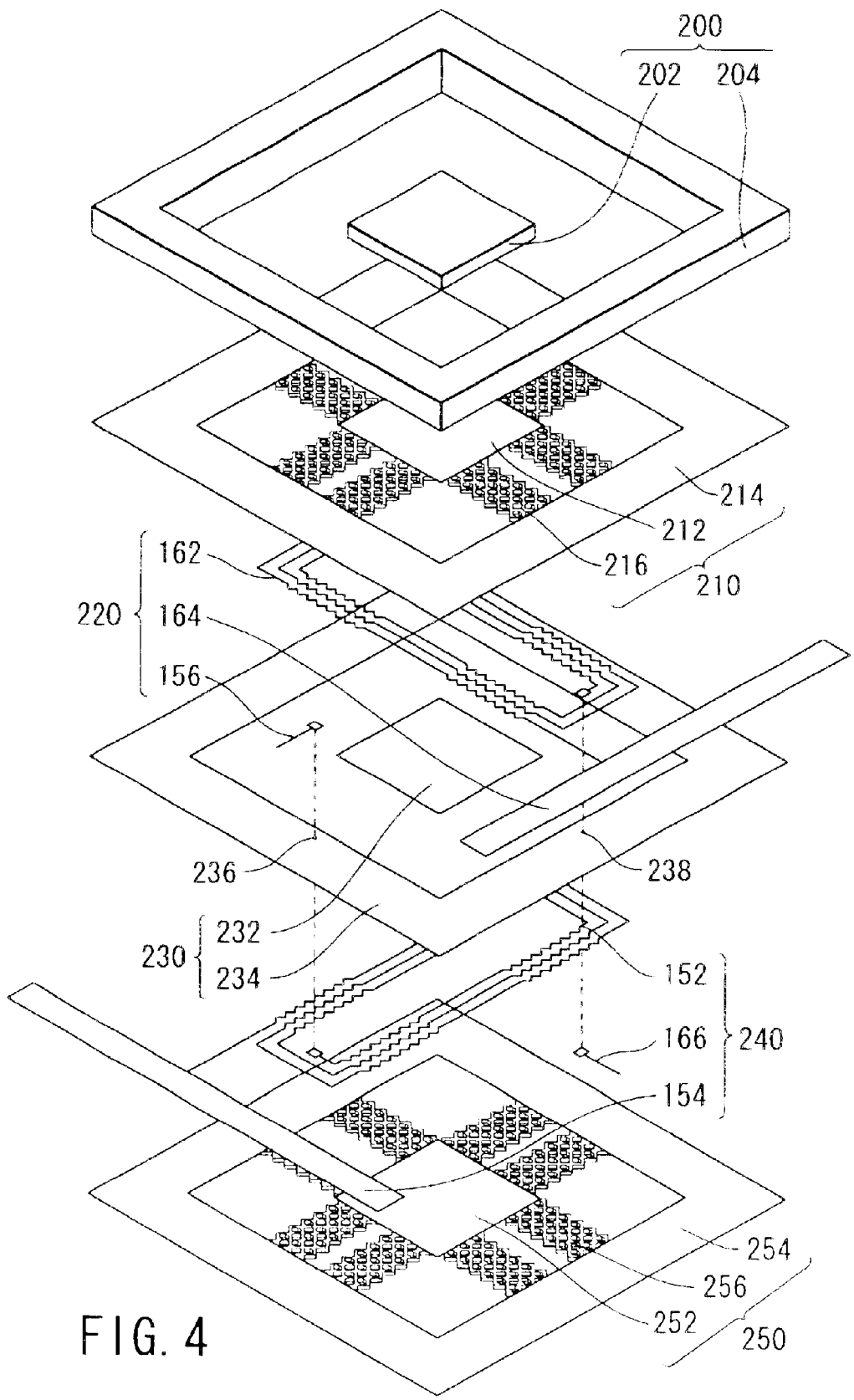
FIG. 4 is an exploded perspective view of the deflecting mirror element depicted in FIG. 2.

As shown in FIG. 4, each of the deflecting mirror elements 110 further includes a first drive wiring 152 extending through the support body 112, the first elastic portions 132 and the movable plate 122, and a second drive wiring 162 extending through the support body 112, the second elastic portions 142 and the movable plate 122.

The first drive wiring 152 includes parts that are positioned in the movable plate 122 and extend in parallel with the first rotational axis $L_1$, and the second drive wiring 162 includes parts that are positioned in the movable plate 122 and extend in parallel with the second rotational axis $L_2$. Therefore, the parts of the first drive wiring 152 positioned in the movable plate 122 and the parts of the second drive wiring 162 positioned in the movable plate 122 are orthogonal to each other, and extend with an inclination of 45° with respect to the parallel magnetic field 190 generated by the permanent magnets 104.

Furthermore, the parts of the first drive wiring 152 positioned in the movable plate 122 are located line-symmetrically with respect to the first rotational axis $L_1$, and the parts of the second drive wiring 162 positioned in the movable plate 122 are located line-symmetrically with respect to the second rotational axis $L_2$.

The first drive wiring 152 is connected to an external drive circuit (not shown) through two wirings provided on the support body 112, namely, a wiring 154 electrically connected to an outer end of the first drive wiring 152 and a wiring 156 electrically connected to an inner end of the first drive wiring 152. Likewise, the second drive wiring 162 is connected to an external drive circuit (not shown) through two wirings provided on the support body 112, namely, a wiring 164 electrically connected to an outer end of the second drive wiring 162 and a wiring 166 electrically connected to an inner end of the second drive wiring 162.

Figure 5:
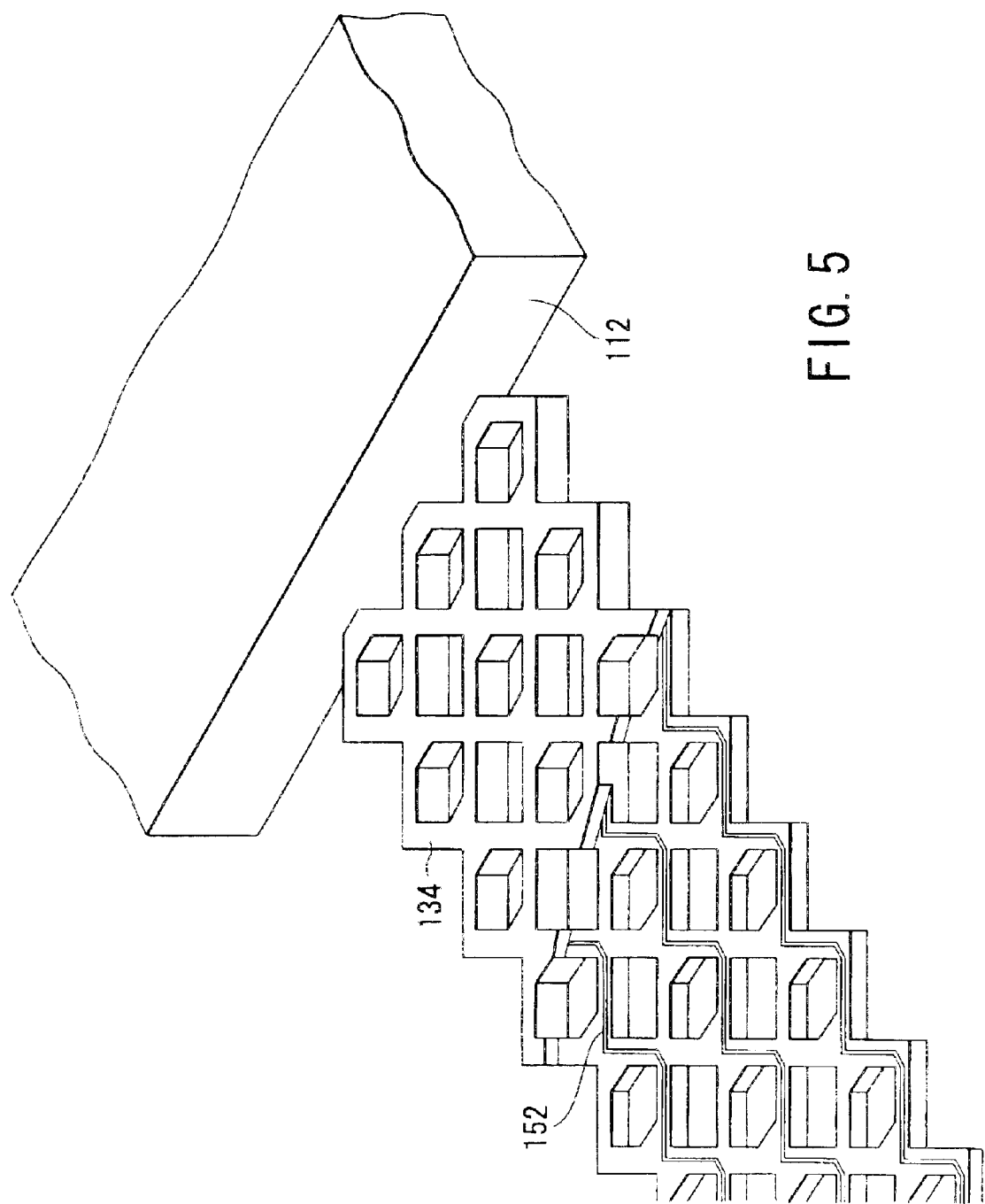
FIG. 5 is an enlarged partial cross-sectional view showing a part indicated by V in FIG. 2.

As shown in FIG. 5, the elastic members 134 constituting the first elastic portion 132 have a mesh structure. Accordingly, the first drive wiring 152 includes parts that are positioned at the first elastic portions 132 and extend in zigzags. Moreover, parts of the first drive wiring 152 positioned in the pair of first elastic members 134 of each of the first elastic portions 132 are located line-symmetrically with respect to the first rotational axis $L_1$.

Likewise, the elastic members 144 constituting the second elastic portion 142 also have the mesh structure. The second drive wiring 162 includes parts that are positioned in the second elastic portions 142 and extend in zigzags. In addition, parts of the second drive wiring 162 positioned in the pair of second elastic members 144 of each of the second elastic portions 142 are located line-symmetrically with respect to the second rotational axis $L_2$.

The deflecting mirror element 110 is manufactured by applying a semiconductor manufacture technique and using, e.g., a silicon substrate as a start wafer.

In FIG. 4, the deflecting mirror element 110 comprises, in terms of material, a silicon substrate 200, a first polyimide film 210, a first metal film 220, a second polyimide film 230, a second metal film 240 and a third polyimide film 250, which are laminated each other.

The silicon substrate 200 has a rectangular portion 202 and a frame-like portion 204 surrounding the rectangular portion 202; the first polyimide film 210 has a rectangular portion 212, a frame-like portion 214 surrounding the rectangular portion 212 and a mesh-like portion 216 connecting these portions; the first metal film 220 includes the second drive wiring 162, the wiring 164 and the wiring 156; the second polyimide film 230 has a rectangular portion 232 and a frame-like portion 234 surrounding the rectangular portion 232; the second metal film 240 includes the first drive wiring 152, the wiring 154 and the wiring 166; and the third polyimide film 250 has a rectangular portion 252, a frame-like portion 254 surrounding the rectangular portion 252 and a mesh-like portion 256 connecting these portions.

The second polyimide film 230 constitutes an interlayer insulating film for insulating the first metal film 220 and the second metal film 240. The wiring 156 is electrically connected to an inner end of the first drive wiring 152 through a via hole 236 formed in the second polyimide film 230. Additionally, the wiring 166 is electrically connected with an inner end of the second drive wiring 162 through a via hole 238 formed in the second polyimide film 230.

The rectangular part 202 of the silicon substrate 200 mainly constitutes the movable plate 122, and the frame-like portion 204 of the silicon substrate 200 mainly constitutes the support body 112. The mesh-like portion 216 of the first polyimide film 210 and the mesh-like portion 256 of the third polyimide film 250 mainly constitute the first elastic members 134 and the second elastic members 144.

Figure 6:
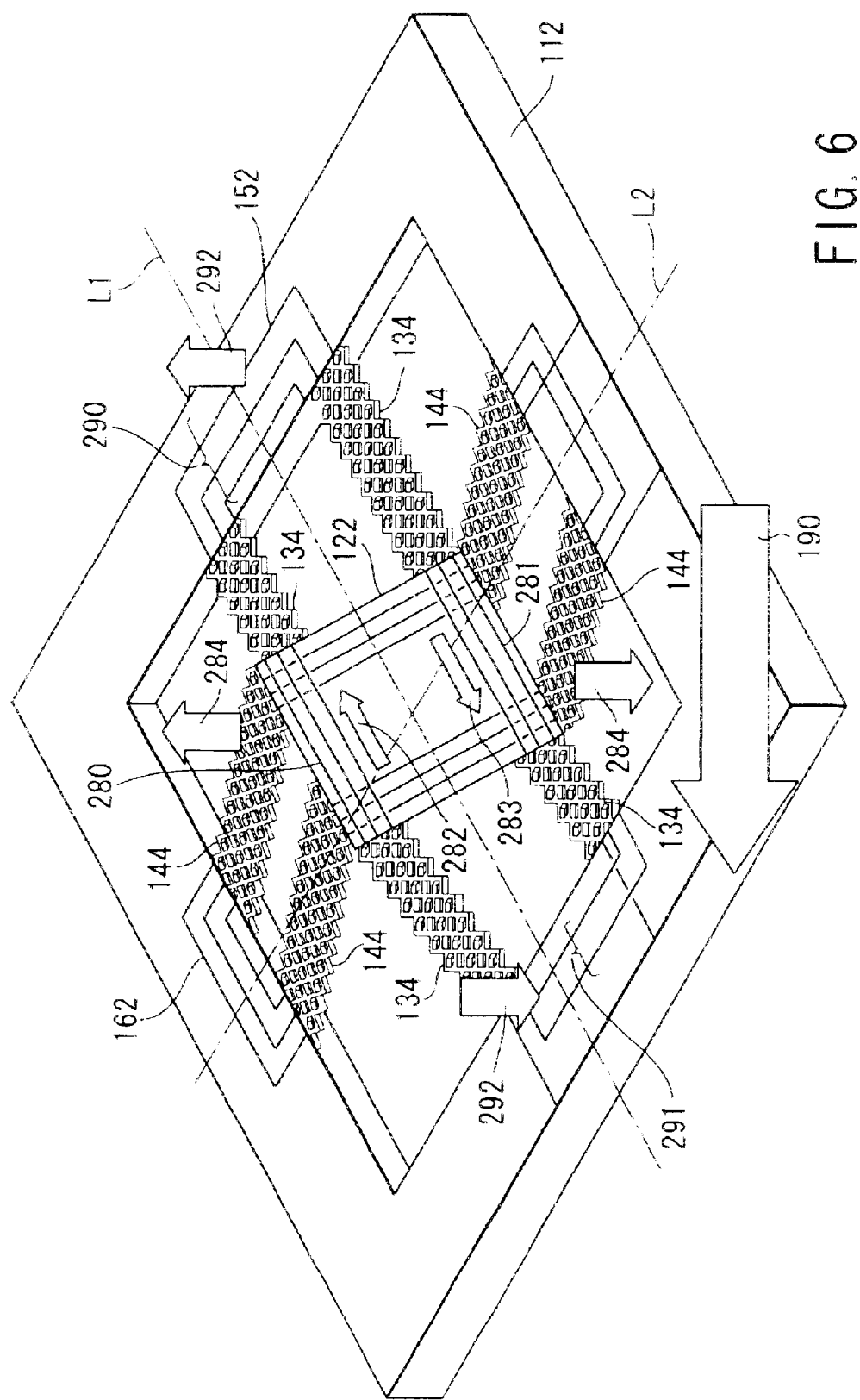
FIG. 6 is a view for illustrating the activity of the deflecting mirror element depicted in FIG. 2.

In FIG. 6, when a current is caused to flow through the first drive wiring 152, current components 282 and 283 which have the same magnitude and opposite directions to each other flow through the portions 280 and 281 of the first drive wiring 152 positioned in the movable plate 122. These current components 282 and 283 generate a couple 284 about the first rotational axis $L_1$ positioned at the center of each of the wiring portions 280 and 281 by the interaction of the magnetic field 190. The couple 284 rotates the movable plate 122 about the first rotational axis $L_1$ to a position balanced with the repulsive force caused due to elastic deformation of the elastic members 134 and 144. The rotational angle of the movable plate 122 depends on the magnitude of the current components flowing through the first drive wiring 152.

Further, opposite current components also flow through the portions 290 and 291 of the first drive wiring 152 positioned in the support body 112. These current components generate a couple 292 about the second rotational axis $L_2$ orthogonal to the first rotational axis $L_1$. However, since the wiring portions 290 and 291 are formed in the support body 112, the couple 292 does not adversely affect driving of the movable plate 122.

Finally, since the portions 280 and 281 of the first drive wiring 152 positioned in the movable plate 122 are parallel with the first rotational axis $L_1$, the current flowing through the first drive wiring 152 generates a drive force to rotate the movable plate 122 about the first rotational axis $L_1$ but does not generate a drive force to rotate the movable plate 122 about the second rotational axis $L_2$.

Therefore, the movable plate 122 can be rotated about the first rotational axis $L_1$ only at a desired angle by controlling the current flowing through the first drive wiring 152.

Likewise, the movable plate 122 can be rotated about the second rotational axis $L_2$ orthogonal to the first rotational axis $L_1$ only at a desired angle by controlling the current flowing through the second drive wiring 162.

Therefore, the movable plate 122 can be directed to a desired direction by controlling the current flowing through the first drive wiring 152 and the current flowing through the second drive wiring 162. As a result, a light beam reflected on the reflecting surface 124 of the movable plate 122 can be oriented to a desired direction.

In the optical deflector 100 according to this embodiment, since the current flowing through one drive wiring generates the drive force to rotate the movable plate about the rotational axis corresponding thereto but does not generate the drive force to rotate the movable plate about the other rotational axis, the crosstalk between the rotational operations corresponding to the respective rotational axes is reduced.

It is to be noted that the parts of the drive wirings 152 and 162 positioned in the elastic members 134 and 144 are formed in zigzags in accordance with the mesh structure of the elastic members and hence the drive forces are locally generated in a direction different from the original rotational direction of the movable plate 122. However, since the undesirable drive forces are opposite in directions to each other in the wiring elements adjacent to each other at a halfway point of the zigzag, they are canceled out, thus the crosstalk has little effect on between the rotational operations mentioned above.

A manufacture process of the deflecting mirror element 110 will now be described with reference to FIGS. 7 to 17.

Figure 7:
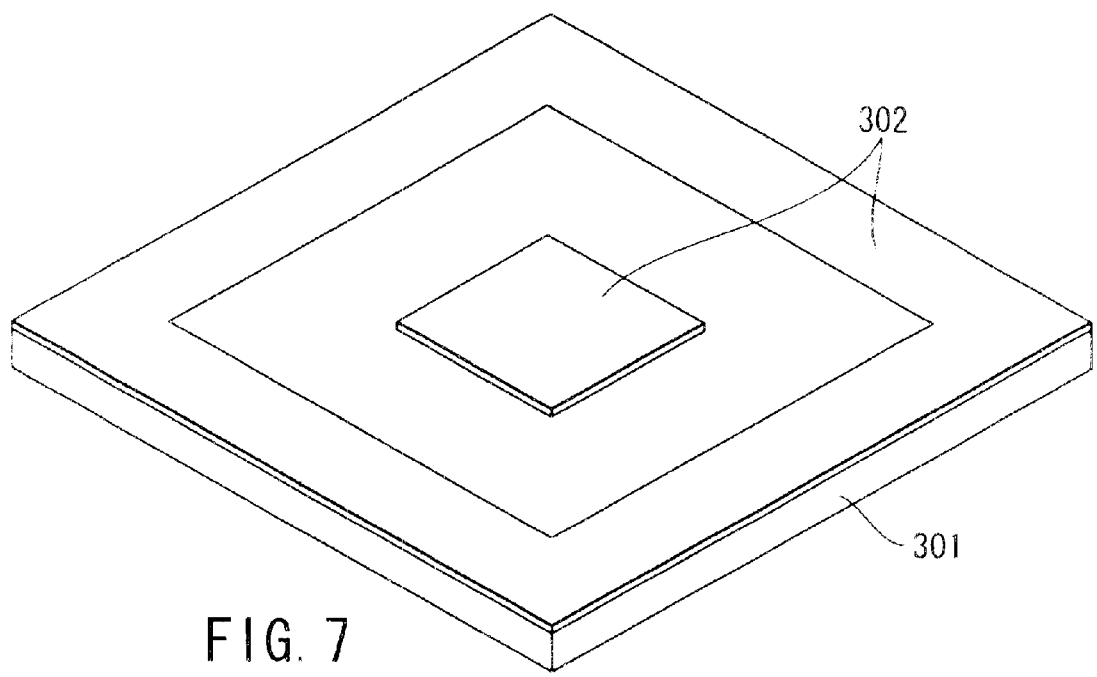
FIG. 7 is a perspective view showing a first process in manufacture of the deflecting mirror element depicted in FIG. 2.

As shown in FIG. 7, an embedded mask 302 is first formed on one surface of the silicon substrate 301. A surface of the silicon substrate 301 on which the embedded mask 302 is formed is referred to as a front side, and a surface opposite to the former surface is referred to as backside.

Figure 8:
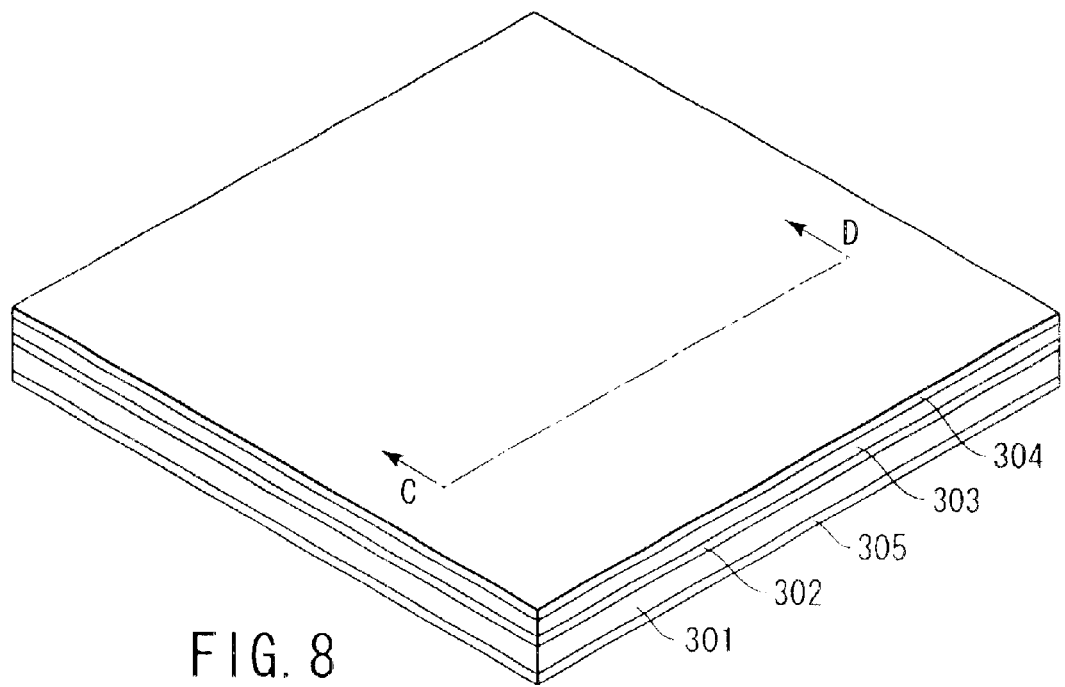
FIG. 8 is a perspective view showing a process following the process illustrated in FIG. 7 in manufacture of the deflecting mirror element depicted in FIG. 2.
Figure 9:
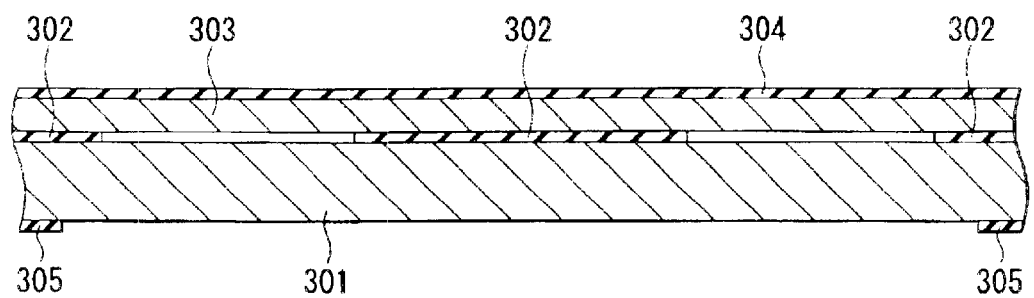
FIG. 9 shows a cross section taken long the line C–D in FIG. 8.

As shown in FIGS. 8 and 9, after forming a silicon film 303 on the surface of the embedded mask 302, an etching stop layer 304 is formed on the surface of the silicon film 303 and a silicon-etching mask 305 is formed on the backside of the silicon substrate 301. Here, a material having the resistance against etching of the silicon substrate, such as a silicon oxide film or a silicon nitride film, is used for the embedded mask 302, the etching stop layer 304 and the silicon-etching mask 305. Furthermore, the silicon film 303 is formed by a method that joins another silicon substrate and then polishes it to a desired thickness or a method which joins an SOI (Silicon on Insulator) substrate comprising support substrate and active layers and an embedded oxide film layer interposed between them and then eliminates the support substrate layer and the embedded oxide film layer of the SOI substrate by etching, etc.

Figure 10:
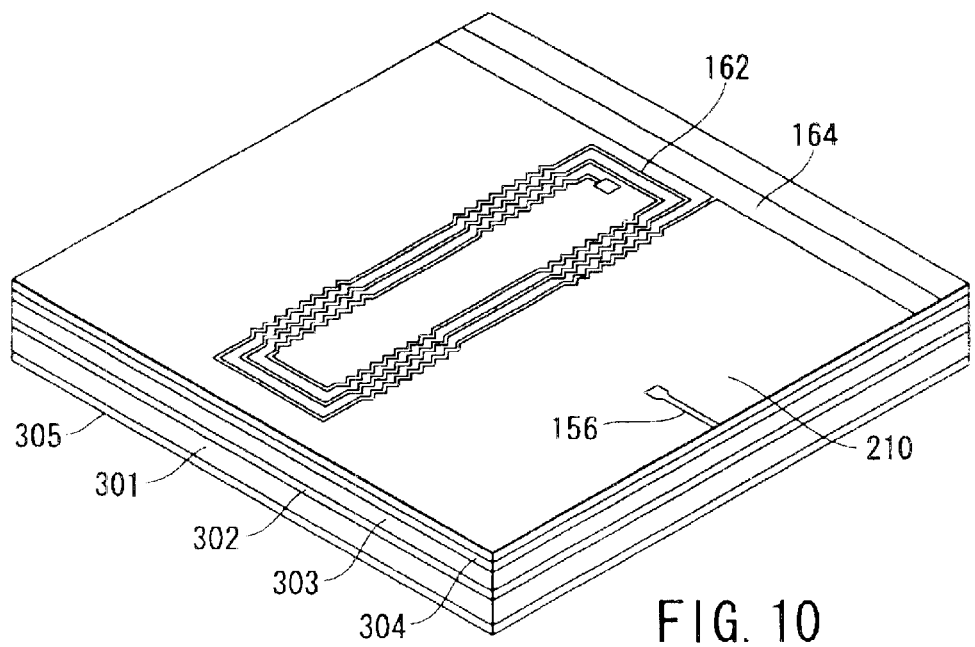
FIG. 10 is a perspective view showing a process following the processes in FIGS. 8 and 9 in manufacture of the deflecting mirror element depicted in FIG. 2.

Then, as shown in FIG. 10, after the first polyimide film 210 is formed on the surface of the etching stop layer 304, the drive wiring 162 and the wirings 156 and 164 are formed. It is desirable to use a material having a low resistivity and high heat conductivity, such as aluminium, for the drive wiring 162 and the wirings 156 and 164.

Figure 11:
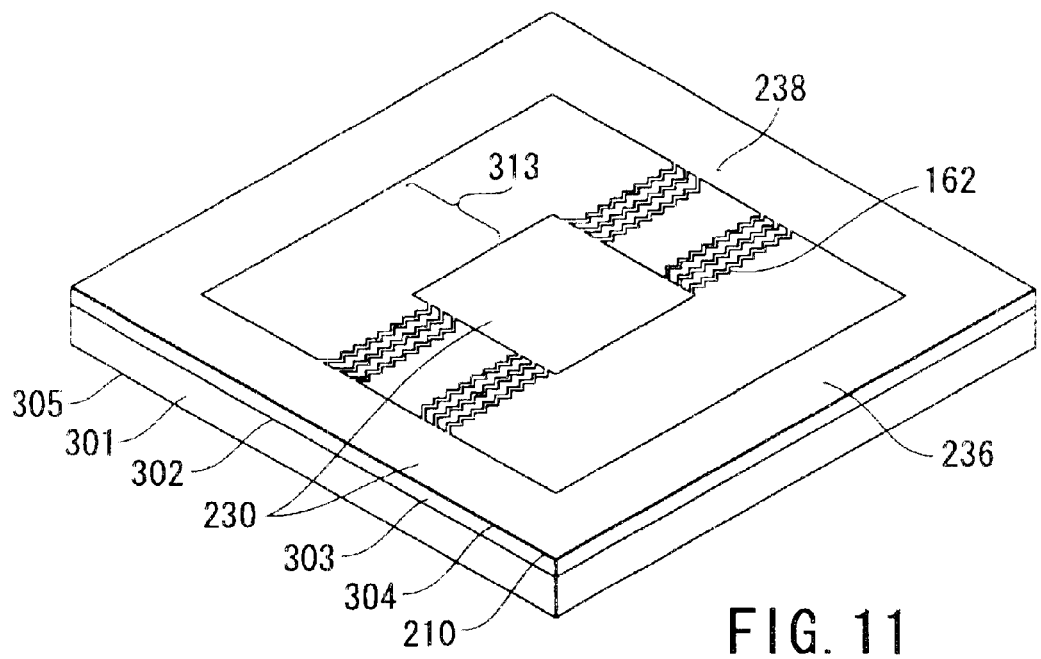
FIG. 11 is a perspective view showing a process following the process in FIG. 10 in manufacture of the deflecting mirror element depicted in FIG. 2.

Subsequently, as shown in FIG. 11, after the second polyimide film 230 is formed on the front side of the first polyimide film 210, via holes 236 and 238 are formed to the polyimide film 230. Here, when removing the part of the via holes from the second polyimide film 230, parts 313 corresponding to areas between the movable plate 122 and the support body 112 shown in FIG. 2 and others are simultaneously removed.

Figure 12:
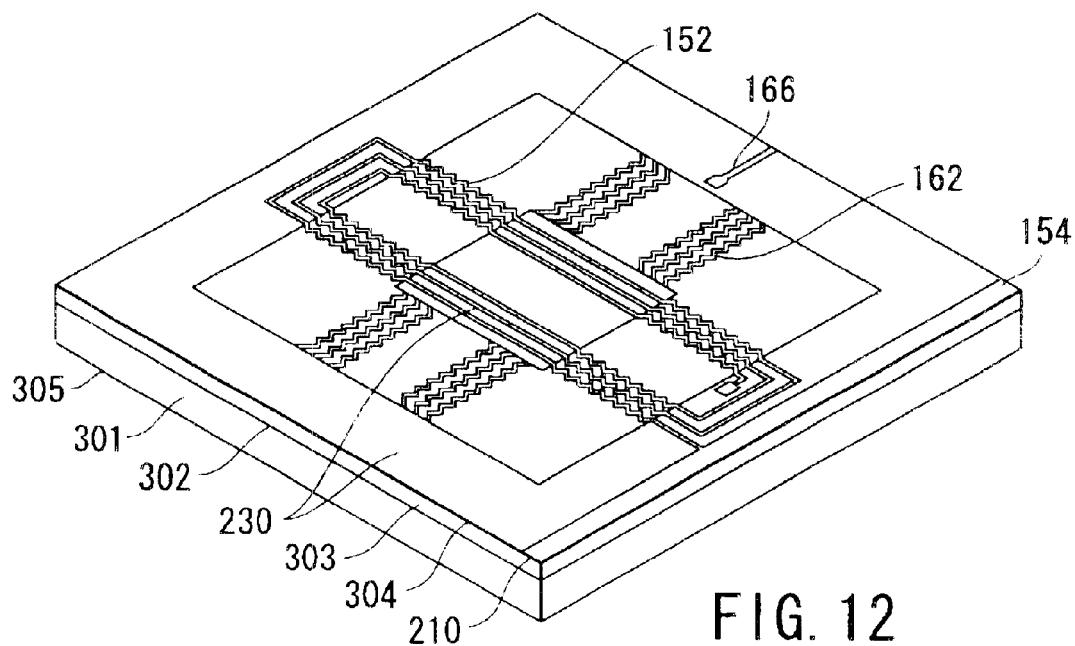
FIG. 12 is a perspective view showing a process following the process in FIG. 11 in manufacture of the deflecting mirror element illustrated in FIG. 2.

Then, as shown in FIG. 12, the drive wiring 152 and the wirings 166 and 154 are formed on the front side of the second polyimide film 230. The drive wiring 152 and the wiring 166 are connected to the wiring 156 and the drive wiring 162 by the via holes 236 and 238 formed in the process depicted in FIG. 11. Like the drive wiring 162 or the wirings 156 and 164, it is desirable to use a material having the low resistivity and high heat conductivity for the drive wiring 152 or the wirings 166 and 154.

Figure 13:
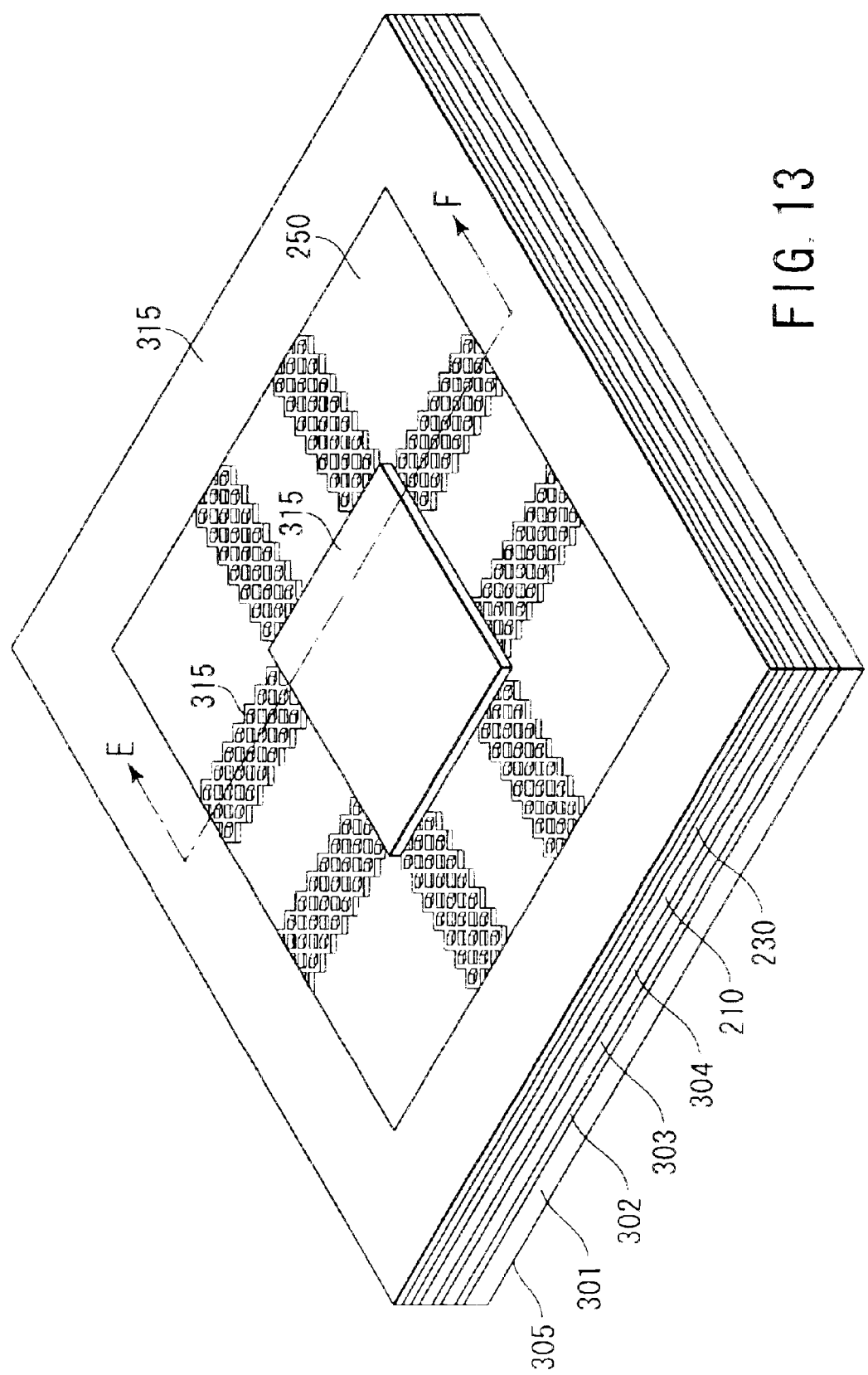
FIG. 13 is a perspective view showing a process following the process in FIG. 12 in manufacture of the deflecting mirror element depicted in FIG. 2.
Figure 14:
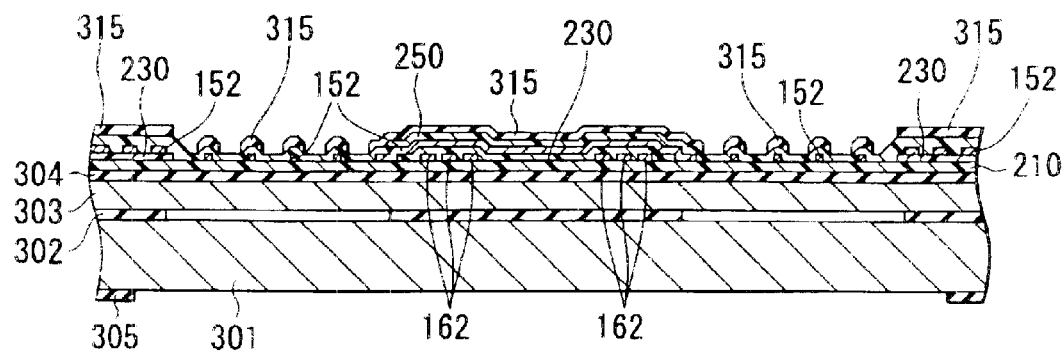
FIG. 14 shows a cross section taken along the line E–F in FIG. 13.

Subsequently, as shown in FIGS. 13 and 14, after the polyimide film 250 as a third layer is formed on the front side of the second polyimide film 230, a polyimide etching mask 315 is formed on the front side thereof. For the polyimide etching mask 315, there is used a material which can form a film at a temperature lower than a heat resistance temperature of the polyimide film or the wiring material such as a silicon oxide film formed by a PCVD (Plasma Assisted Chemical Vapor Deposition) method, resist against etching of the polyimide film and be removed without prejudicing any other constituent element.

Figure 15:
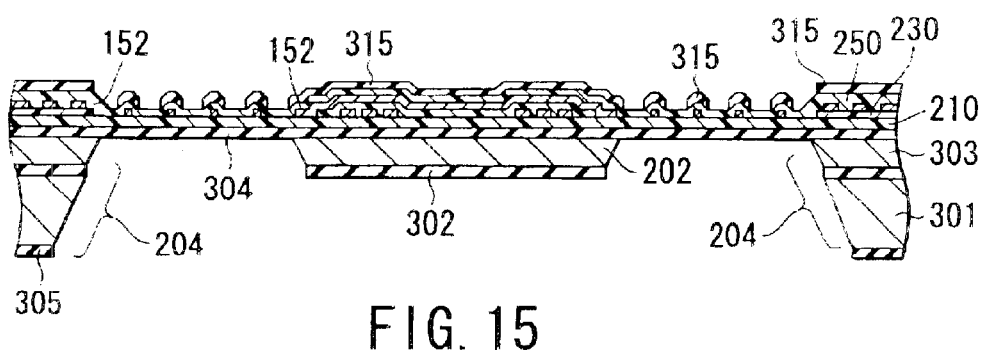
FIG. 15 is a cross-sectional view taken along the line E–F in FIG. 13, showing a process following the processes in FIGS. 13 and 14 in manufacture of the deflecting mirror element depicted in FIG. 2.

Then, as shown in FIG. 15, the support body 112 and the movable plate 122 are formed by etching the silicon substrate 301 and the silicon film 303 from the back side until the etching stop layer 304 is completely exposed through the silicon etching mask 305 or the embedded mask 302, the front side of the substrate being protected by any method. This etching is carried out by wet etching using an alkali etching liquid such as TMAH (Tetramethyl ammonium hydroxide) or dry etching by a DRIE (Deep Reactive Ion Etching) method.

Figure 16:
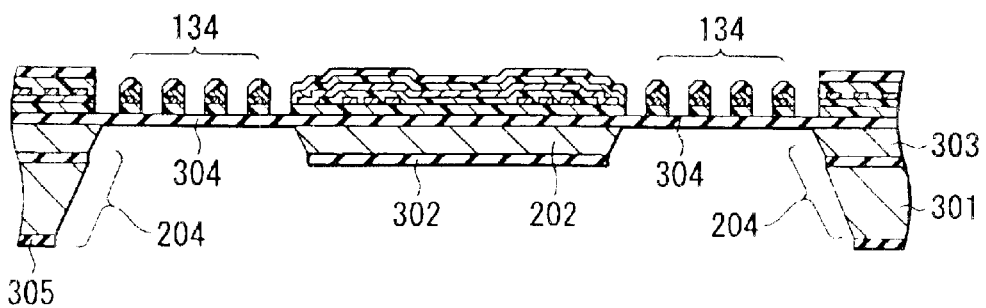
FIG. 16 is a cross-sectional view taken along the line E–F in FIG. 13, showing a process following the process in FIG. 15 in manufacture of the deflecting mirror element depicted in FIG. 2.

Subsequently, as shown in FIG. 16, the elastic members 134 and 144 having the mesh structure are formed and parts of feeder pads (not shown) or the like are opened by etching the polyimide films 210, 230 and 250 by the RIE (Reactive Ion Etching) method from the front side through the polyimide etching mask 315.

Figure 17:
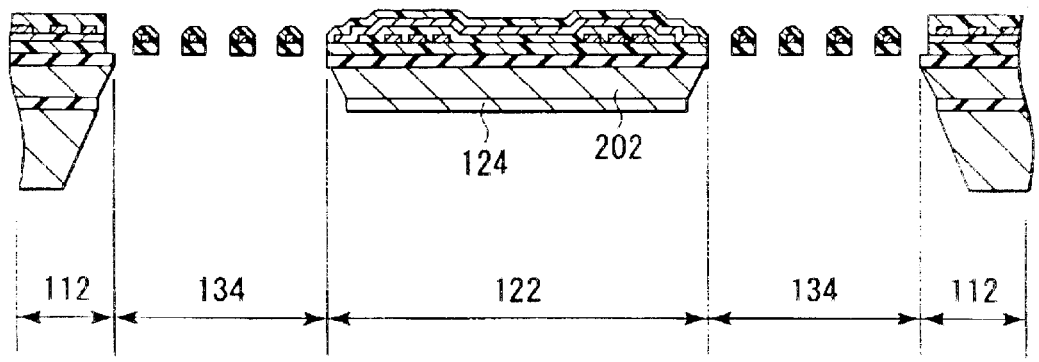
FIG. 17 is a cross-sectional view taken along the line E–F in FIG. 13, showing a process following the process in FIG. 16 in manufacture of the deflecting mirror element depicted in FIG. 2.

Finally, as shown in FIG. 17, after the exposed parts of the etching stop layer 304, the embedded mask 302 and the silicon etching mask 305 are removed, the reflecting surface 124 is formed on the back side of the movable plate 122, thereby bringing the deflecting mirror element 110 to completion.

Various modifications or changes may be made to this embodiment without departing from the scope of the invention.

Although the element structure of the mesh structure of the elastic members 134 and 144 are a rectangle or a rhombus as shown in FIG. 5 in this embodiment, the present invention is not limited to, and any other arbitrary shape, such as other polygons, a circle or an ellipse, may be adopted. Although the mesh structure comprises one type of element structure in this embodiment, it may comprise a combination of types of element structures having different dimensions or shapes.

Figure 18:
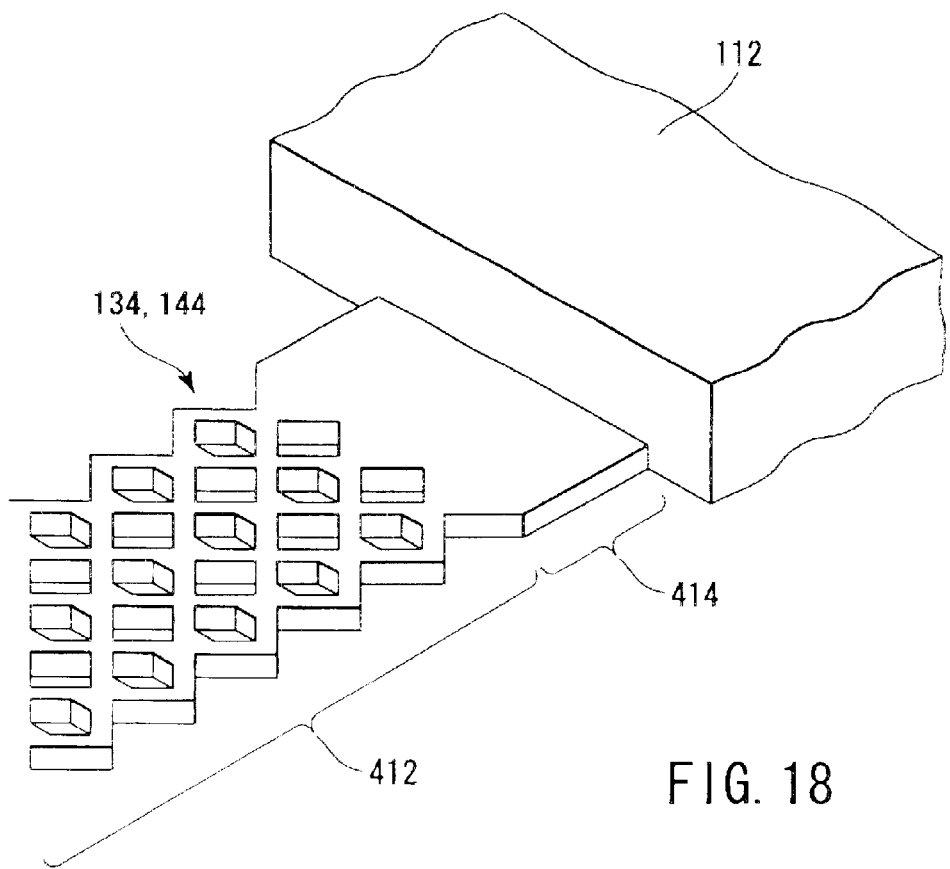
FIG. 18 shows a modification of elastic members which are constituent elements of elastic portions depicted in FIG. 2.

Further, although the elastic members 134 and 144 are entirely configured by the mesh structure as shown in FIG. 5 in this embodiment, the present invention is not restricted thereto, the structure partly having the mesh structure may be adopted. That is, as shown in FIG. 18, each of the elastic members 134 and 144 may comprise a mesh structure part 412 and a plate-like part 414.

Furthermore, other insulating material, such as a silicon oxide film or a silicon nitride film, may be used in place of the second polyimide film 230.

Moreover, the polyimide films 210, 230 and 250 may be substituted by a film comprising an elastic material having other insulating properties, such as a silicone resin or parylene.

Figure 19:
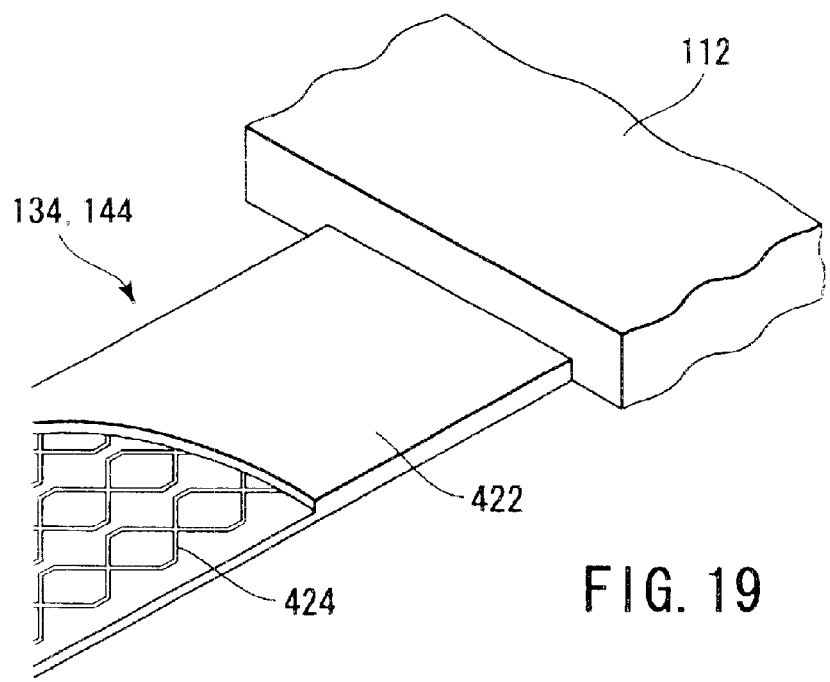
FIG. 19 shows another modification of the elastic members which are constituent elements of the elastic portions depicted in FIG. 2.

In addition, as shown in FIG. 19, each of the elastic members 134 and 144 may comprise a plate-like elastic material 422 and wiring portions 424 comprising successive rhombuses as a chain that are formed in the elastic material 422 instead of having the mesh structure. Additionally, the wiring portions 424 may be formed in zigzag shape or linear shape.

However, considering the fact that plastic deformation or breakage of a wire is apt to occur to the linear wiring with respect to elongation of the elastic members 134 and 144, i.e., deformation along the longitudinal axis, it is preferable for the wiring 424 to have a zigzag form. Since deformation of the zigzag wiring 424 caused by a force that produces the elongation to the elastic members 134 and 144 is bending deformation, the zigzag wiring 424 can readily follow the elongation of the elastic members 134 and 144 to be deformed.

Although the zigzag wiring portion 424 receives the drive force in a direction different from the original rotational direction of the movable plate 122, such excessive drive forces are opposite between the wiring elements adjacent to each other in the halfway part of the zigzag form and canceled out, and hence they hardly affect the crosstalk between the rotational operations corresponding to the respective rotational axes of the movable plate 122.

Figure 20:
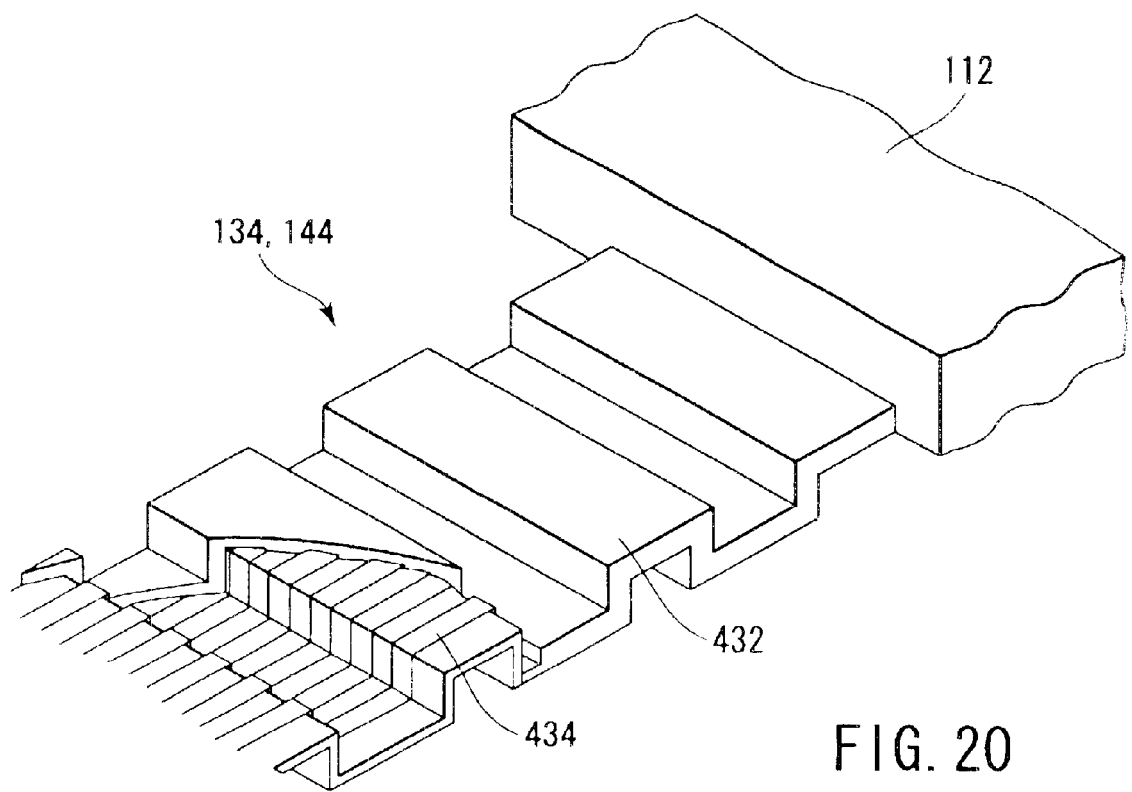
FIG. 20 shows still another modification of the elastic members which are constituent elements of the elastic portions depicted in FIG. 2.

Furthermore, as shown in FIG. 20, the elastic members 134 and 144 may comprise an elastic material 432 having a periodic bending structure and a wiring 434 linearly extending in the elastic material 432 in the longitudinal direction. In this structure, a width of the wiring 434 may be made relatively large. This advantageously reduces the resistance of the wiring to decrease power consumption or heat generation.

Moreover, the drive circuit of the deflecting mirror element 110 may be formed inside the deflector 100, for example, on the surface of the support body 112.

In addition, a structure to release heat or cool down may be provided inside the deflecting mirror element 110.

Figure 21:
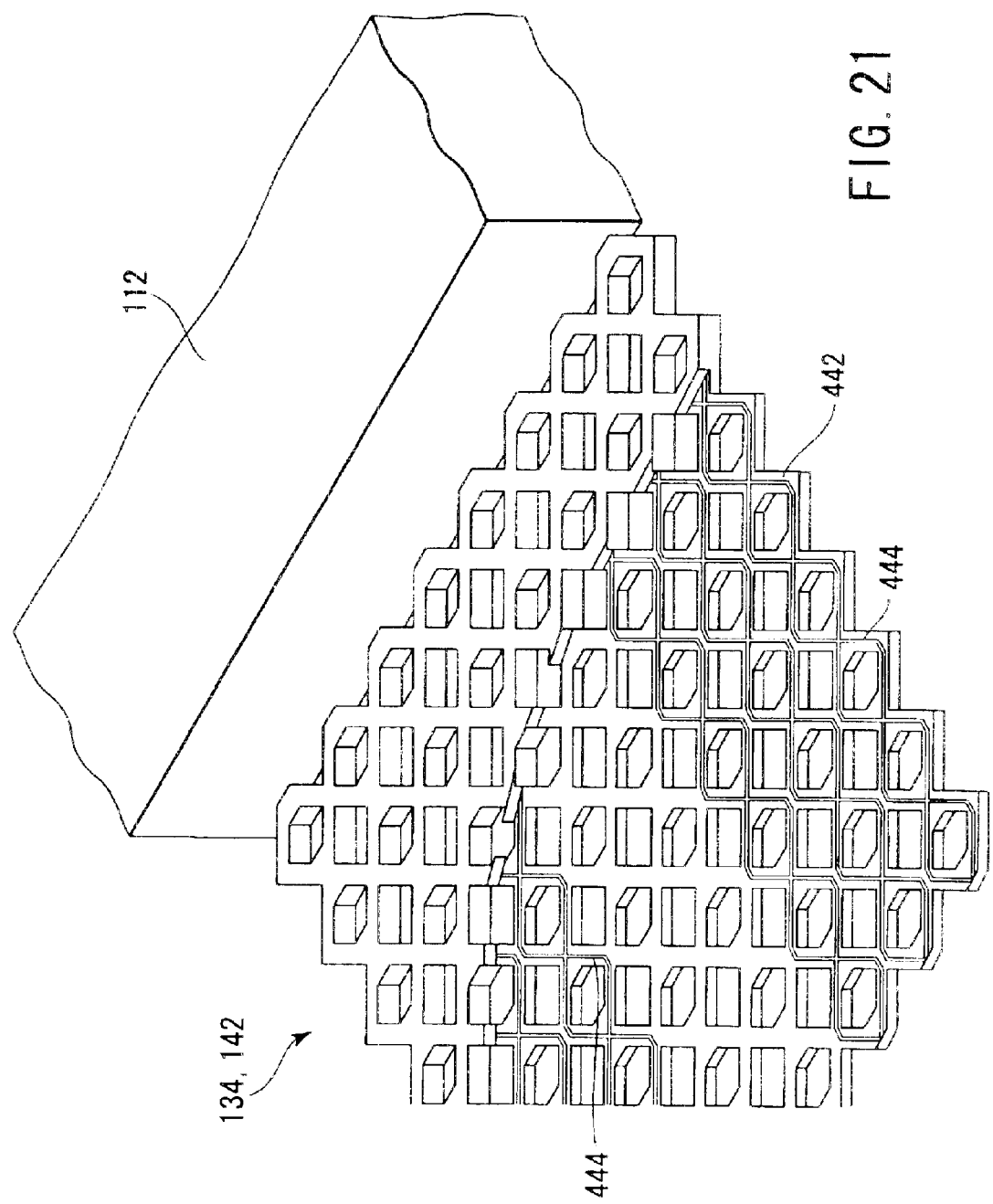
FIG. 21 shows a modification of the elastic portions consisting of a pair of elastic members depicted in FIG. 2.

Additionally, although the elastic portion 132 comprises the pair of elastic members 134 and the elastic portion 142 comprises the pair of elastic members 144, each of the elastic portions 132 and 142 may comprise an elastic member 442 having the mesh structure and zigzag wiring portions or wiring portions 444 comprising successive rhombuses as a chain that are formed inside the elastic member 442 and extend near the edges on both sides, as shown in FIG. 21.

Further, in FIG. 2, the wirings formed inside the elastic members 134 and 144 may be the wiring portions 444 each comprising successive rhombuses as a chain, as shown in FIG. 21, instead of the zigzag wiring portions such as shown in FIG. 5.

Figure 22:
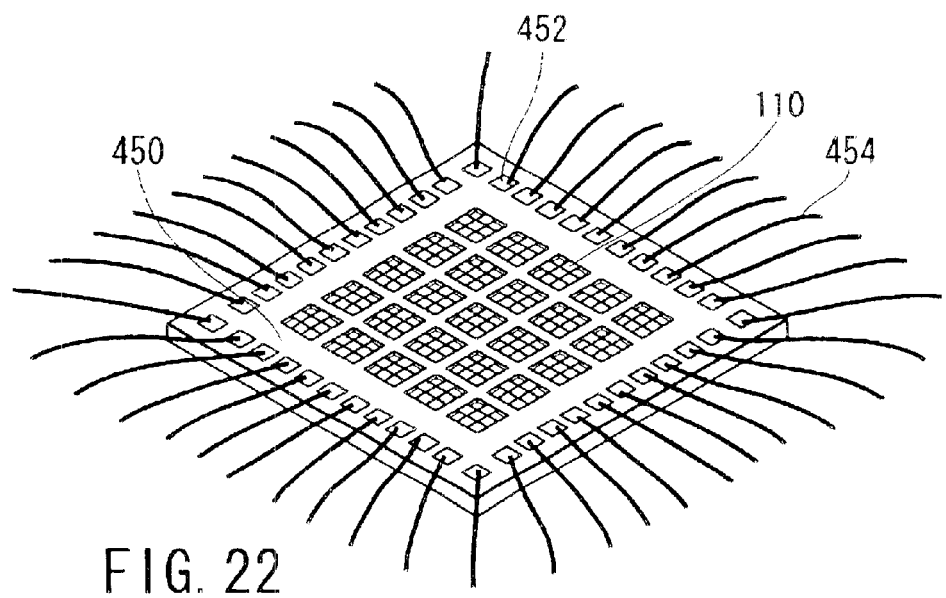
FIG. 22 is a view for illustrating a mounting method of the deflecting mirror element array depicted in FIG. 1.

Furthermore, mounting of the deflecting mirror element array 102 shown in FIG. 1 onto a package and the like is, for example, carried out, as shown in FIG. 22, by previously forming feeder pads 452 electrically connected to the respective deflecting mirror elements 110 on the periphery of the chip 450 having the deflecting mirror elements 110, and then connecting the feeder pads 452 to the (non-illustrated) terminal formed on the package with wires 454.

Figure 23:
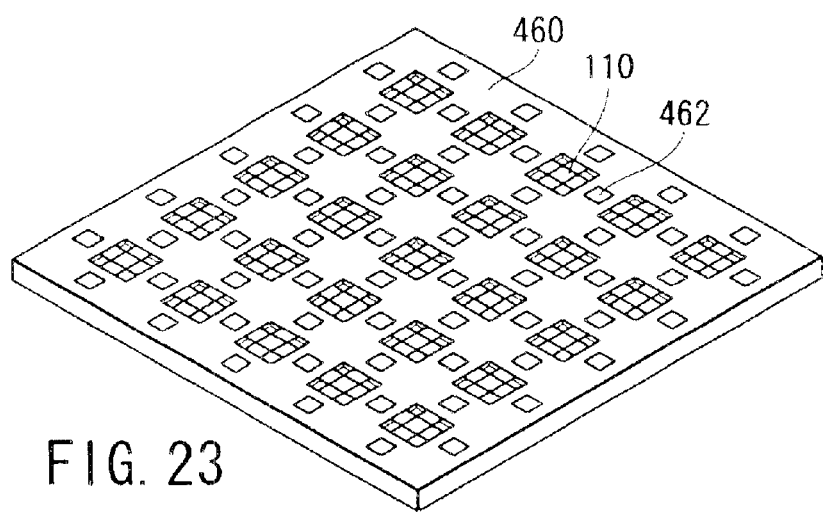
FIG. 23 is a view for illustrating another mounting method of the deflecting mirror element array depicted in FIG. 1.
Figure 24:
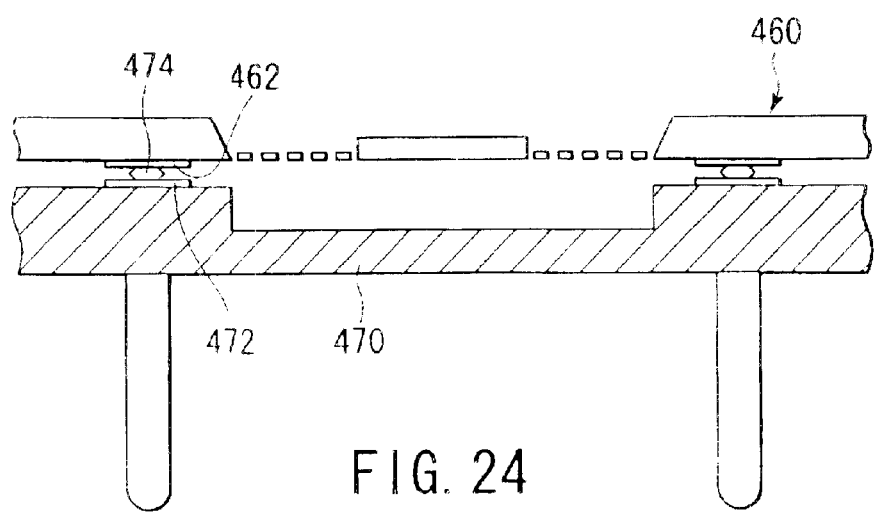
FIG. 24 shows how the deflecting mirror element array depicted in FIG. 23 is mounted in a BGA (Ball Grid Array) package.

However, in regard to mounting of the deflecting mirror element array 102, more preferably, as shown in FIG. 23, the feeder pads 462 electrically connected to the respective deflecting mirror elements 110 are previously formed on the chip 460 having the deflecting mirror elements 110 on each deflecting mirror element 110 side, and these feeder pads 462 are connected to the terminal 472 formed as an array on a BGA (Ball Grid Array) package 470 through a bump 474 as shown in FIG. 24.

The latter technique is advantageous when a space to arrange the feeder pads cannot be assured in the chip peripheral part since the number of elements constituting the array is large. In the deflecting mirror element array 102 according to this embodiment, since the reflecting surface 124 formed on the movable plate 122 is formed on a surface on which the feeder pads are formed, i.e., a surface opposite to a surface caused to adhere to the package, it is possible to connect to the terminal arranged on the array of, e.g., the BGA package without requiring special processing such as formation of a through hole in the chip.

Moreover, in the latter technique, a large-scale array can be readily realized by aligning a plurality of chips 460 on the same package and mounted.

In addition, in this embodiment, although description has been given as to the optical deflector that has the reflecting surface on the movable plate allowed to rotate about the first and second rotational axes, the present invention may be an optical deflector that has the movable plate allowed to move in the vertical direction or the front-and-back and right-and-left directions or an electromagnetic drive type actuator that has no reflecting surface on the movable plate.

Second Embodiment

A second embodiment according to the present invention is directed to an optical deflector, which can be substantially regarded as a set of optical deflectors.

Figure 25:
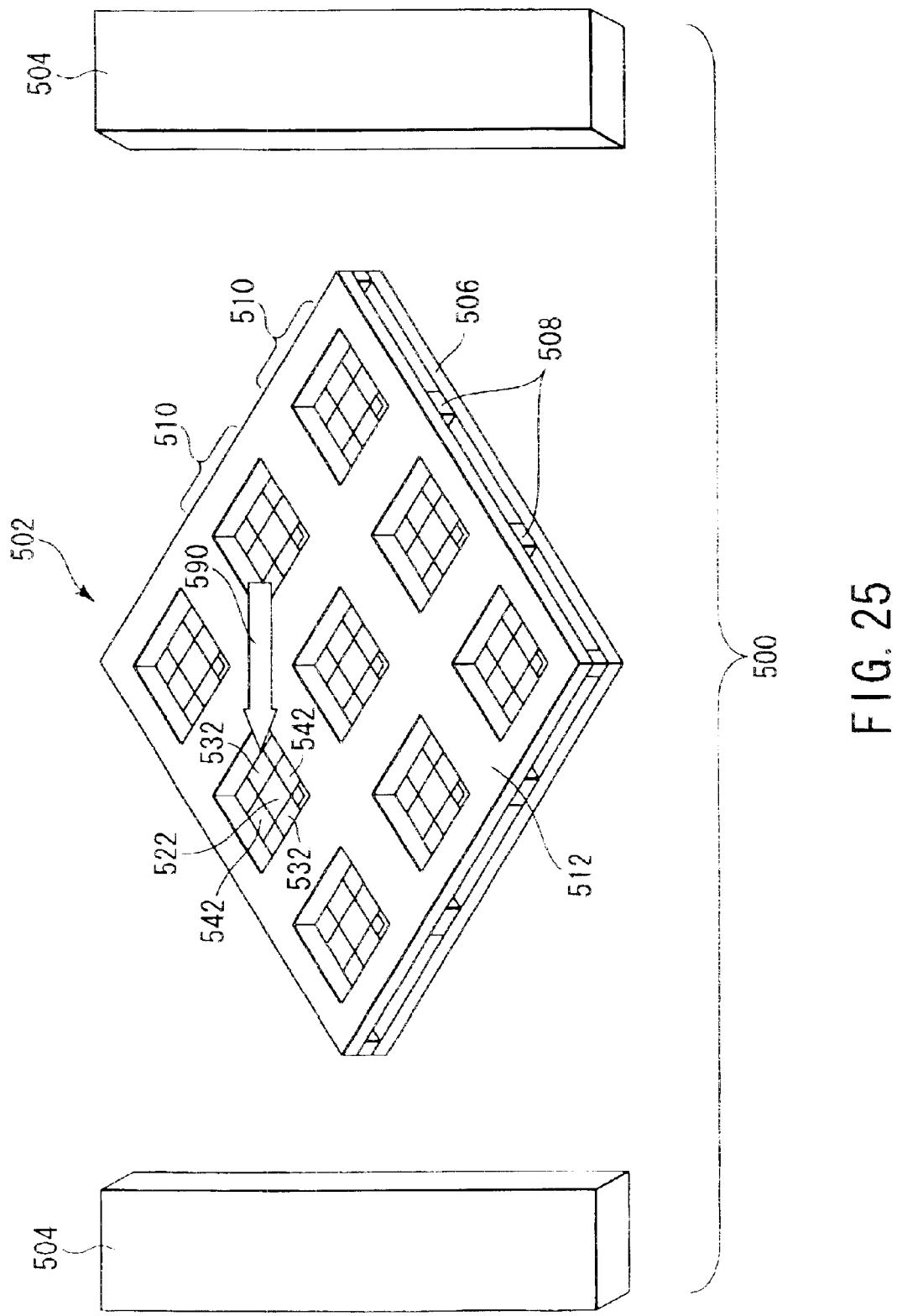
FIG. 25 shows an optical deflector according to a second embodiment of the present invention.

As shown in FIG. 25, an optical deflector 500 has a magnetic field generator, which comprises a pair of permanent magnets 504, for generating a parallel magnetic field 590, a deflecting mirror element array 502, which is arranged in the parallel magnetic field, and an opposed substrate 506, which is arranged so as to be opposed to the deflecting mirror array 502 with a gap. The deflecting mirror element array 502 and the opposed substrate 506 are connected through a plurality of spacers 508. The deflecting mirror element array 502 includes nine deflecting mirror elements 510 arranged as a lattice.

Figure 26:
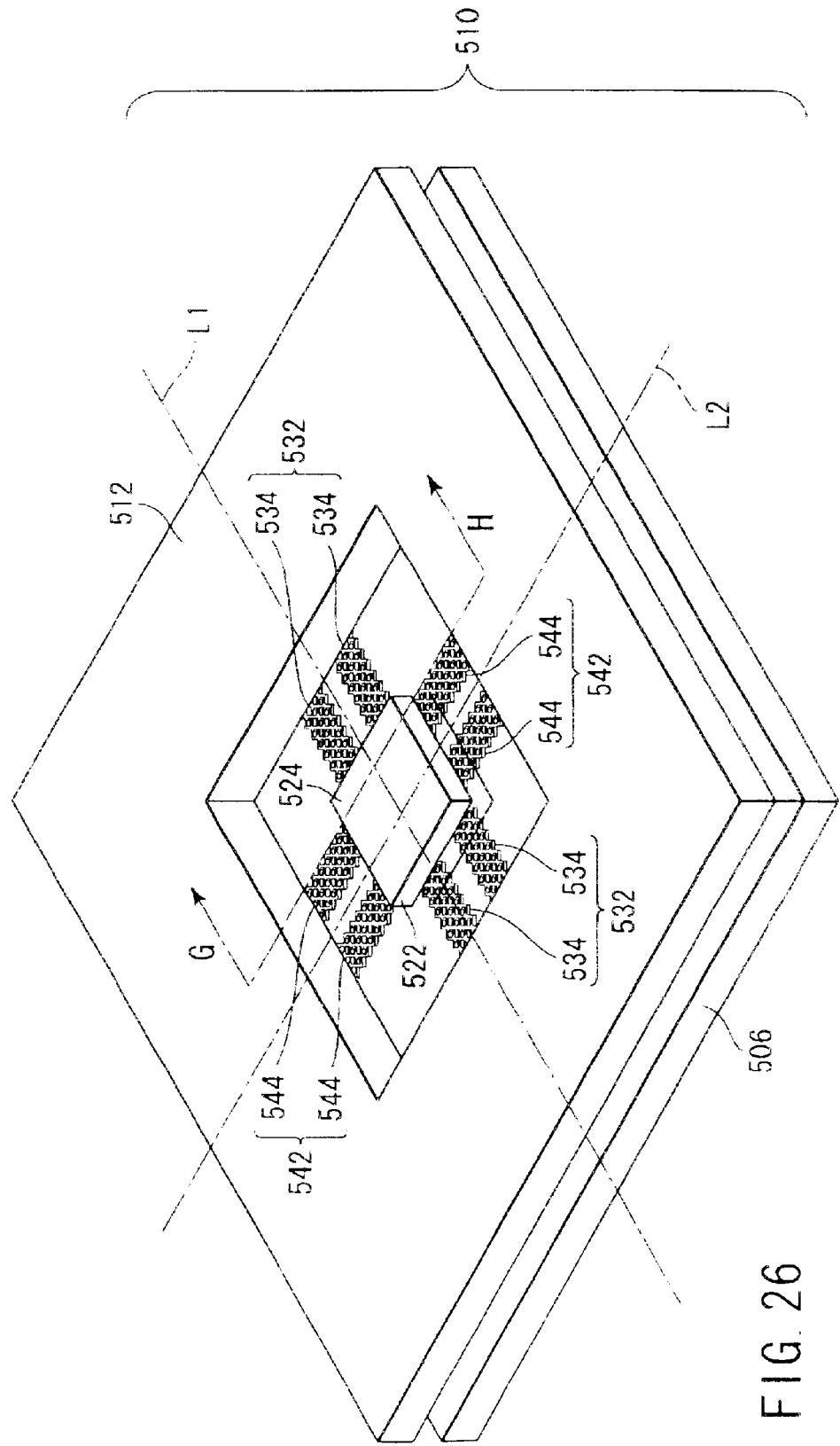
FIG. 26 shows one deflecting mirror element included in the deflecting mirror element array depicted in FIG. 25 in the enlarged manner.

As shown in FIG. 26, each of the deflecting mirror elements 510 comprises a movable plate 522, a support member 512 surrounding the movable plate 522, a pair of first elastic portions 532, which are elastically deformable, for connecting the movable plate 522 and the support body 512, and a pair of second elastic portions 542, which are elastically deformable, for connecting the movable plate 522 and the support body 512.

The support body 512 of an arbitrary deflecting mirror element 510 is connected with the support body 512 of another deflecting mirror element 510. In other words, the support bodies 512 of the deflecting mirror elements 510 are integrally formed from, e.g., one silicon substrate by an etching process.

The movable plate 522 has a reflecting surface 524 for reflecting the light beam on one side thereof.

The first elastic portions 532 support the movable plate 522 with respect to the support body 512 so as to allow the movable plate 522 to rotate about a first rotational axis $L_1$. Each of the first elastic portions 532 comprises a pair of elastic members 534 extending along the first rotational axis $L_1$.

The second elastic portions 542 supports the movable plate 522 with respect to the support body 512 so as to allow the movable plate 522 to rotate about a second rotational axis $L_2$. Each of the second elastic portions 542 comprises a pair of elastic members 544 extending along the second rotational axis $L_2$.

The first rotational axis $L_1$ and the second rotational axis $L_2$ are orthogonal to each other. The magnetic field generator, i.e., the pair of permanent magnets 504 generate a magnetic field having a direction with an angle of 45° with respect to the first rotational axis $L_1$ and the second rotational axis $L_2$.

Figure 28:
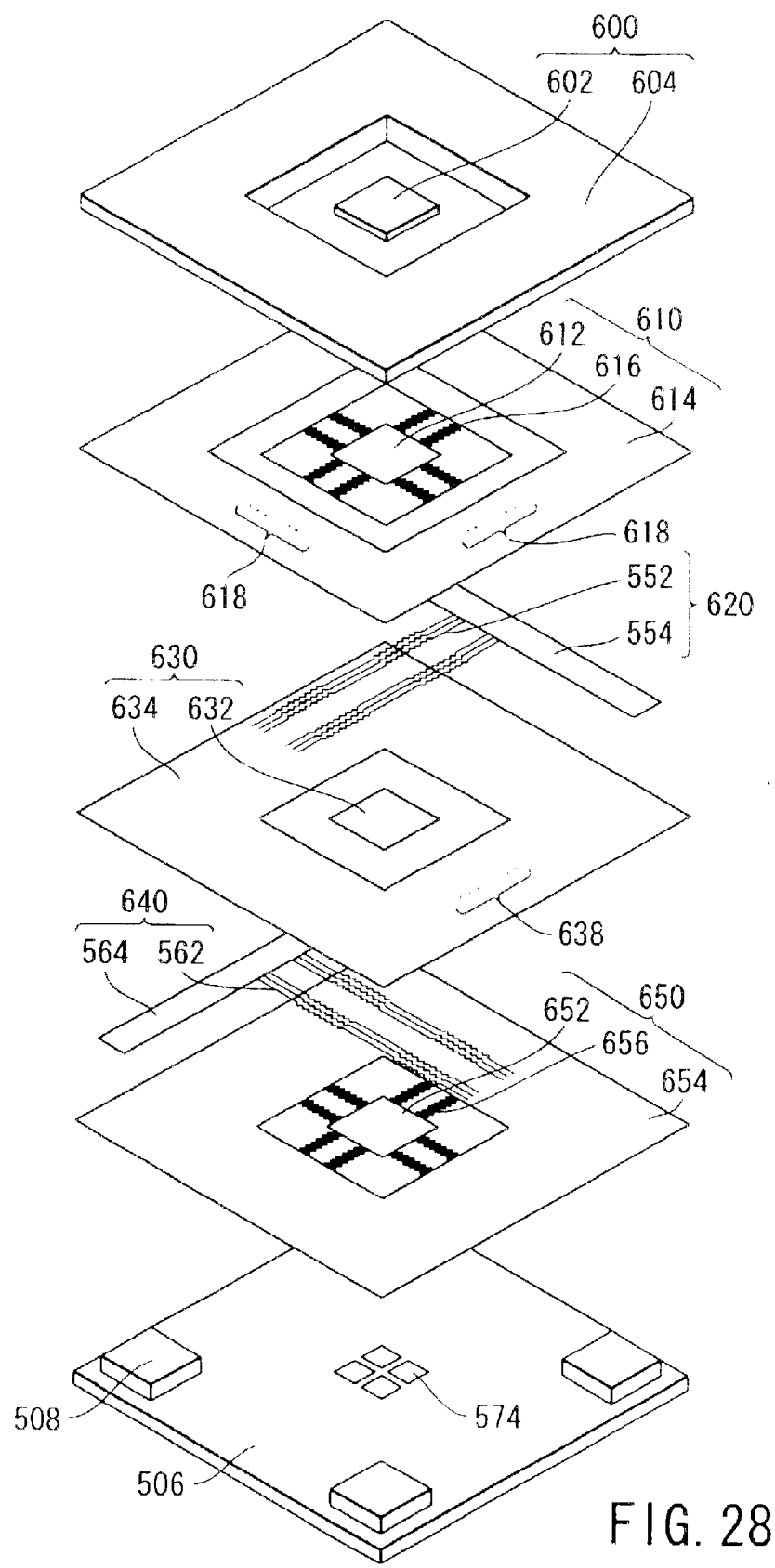
FIG. 28 is an exploded perspective view of the deflecting mirror element depicted in FIG. 26.

Moreover, as shown in FIG. 28, each of the deflecting mirror elements 510 includes first drive wirings 552 running through the support body 512, the first elastic portions 532 and the movable plate 522, and second drive wirings 562 running through the support body 512, the second elastic portions 542 and the movable plate 522.

The first drive wirings 552 all substantially linearly extend along the first rotational axis $L_1$, and the second drive wirings 562 all substantially linearly extend along the second rotational axis $L_2$.

Parts of the first drive wirings 552 positioned in the movable plate 522 extend in parallel with the first rotational axis $L_1$, and parts of the second drive wirings 562 positioned in the movable plate 522 extend in parallel with the second rotational axis $L_2$. Therefore, the parts of the first drive wirings 552 positioned in the movable plate 522 and the parts of the second drive wirings 562 positioned in the movable plate 522 are orthogonal to each other, and extend with an inclination of 45° with respect to the parallel magnetic field 590 formed by the permanent magnets 504.

In addition, the parts of the first drive wirings 552 positioned in the movable plate 522 are located line-symmetrically with respect to the first rotational axis $L_1$, and the parts of the second drive wirings 562 positioned in the movable plate 522 are located line-symmetrically with respect to the second rotational axis $L_2$.

Figure 27:
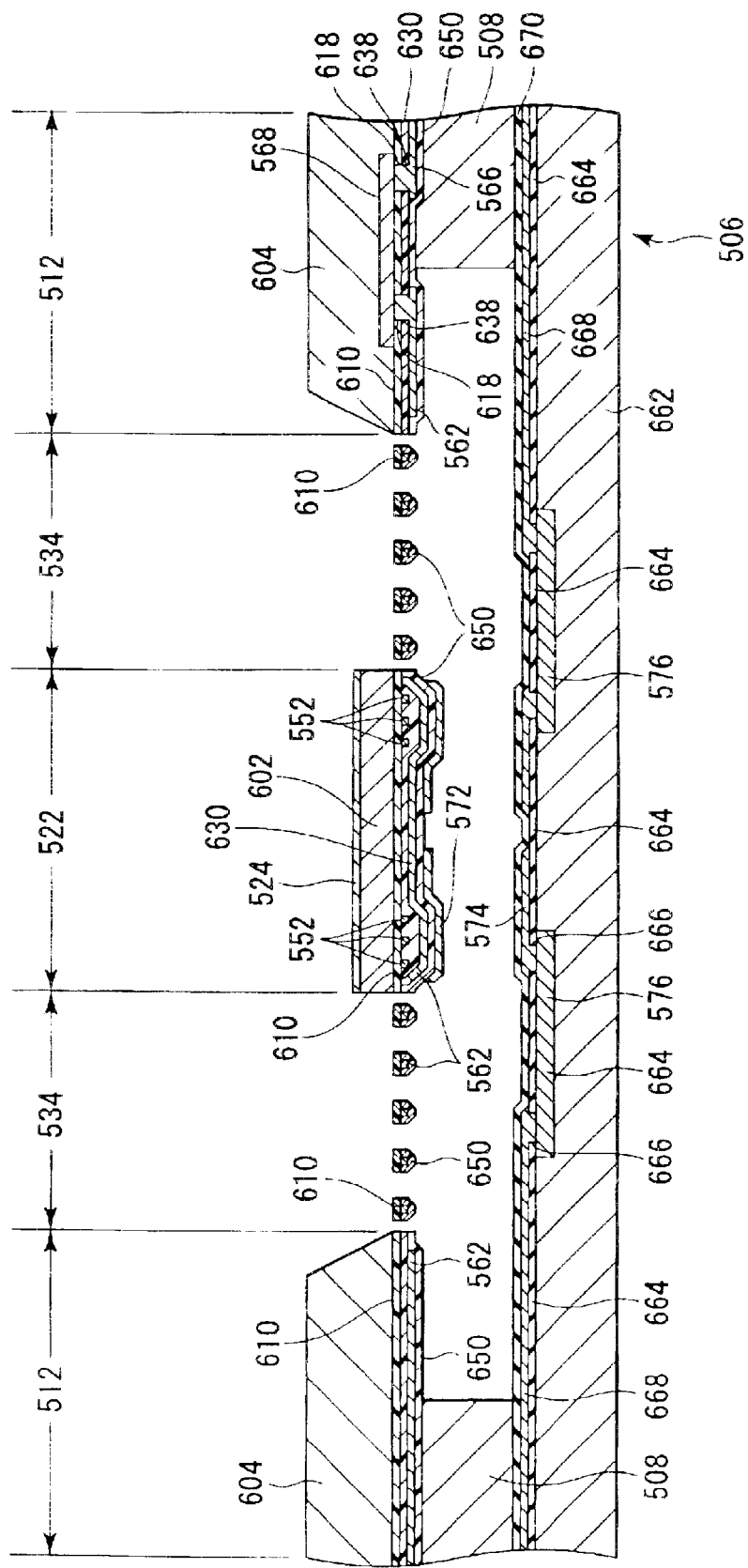
FIG. 27 shows a cross section of the deflecting mirror element depicted in FIG. 26 taken along the line G–H.

One end of each of the second drive wirings 562 is electrically connected to a wiring 564 provided to the support body 512, and the other end of each of the same is, as shown in FIG. 27, electrically connected to a wiring 566 for electrically connection with an external device through a selection circuit 568 for selecting the second drive wiring 562 through which a current is caused to flow. The selection circuit 568 has a switching function and comprises a digital circuit such as a CMOS circuit. Likewise, one end of each of the first drive wirings 552 is electrically connected to a wiring 554 provided to the support body 512 as shown in FIG. 28, and the other end of the same is electrically connected with a wiring for electrical connection with an external device through a selection circuit like the selection circuit 568 although not shown.

As shown in FIG. 26, the elastic members 534 constituting the first elastic portions 532 have the mesh structure, and parts of the first drive wirings 552 positioned in the first elastic portions 532 extend in zigzags as shown in FIG. 28. In addition, parts of the first drive wirings 552 positioned in each of the pair of first elastic members 534 of the first elastic portions 532 are located line-symmetrically with respect to the first rotational axis $L_1$.

Likewise, the elastic members 544 constituting the second elastic portions 542 have the mesh structure, and parts of the second drive wirings 562 positioned in the second elastic portions 542 extend in zigzags. Additionally, parts of the second drive wirings 562 positioned in each of the pair of second elastic members 544 of the second elastic portions 542 are located line-symmetrically with respect to the second rotational axis $L_2$.

The deflecting mirror elements 510 are manufactured by applying a semiconductor manufacture technique and using, e.g., a silicon substrate as a start wafer.

In FIG. 28, in terms of materials, the deflecting mirror element 510 comprises a silicon substrate 600, a first polyimide film 610, a first metal film 620, a second polyimide film 630, a second metal film 640, and a third polyimide film 650, which are laminated each other.

The silicon substrate 600 has a rectangular portion 602 and a frame-like portion 604 surrounding the rectangular portion 602; the first polyimide film 610 has a rectangular portion 612, a frame-like portion 614 surrounding the rectangular portion 612 and mesh-like portions 616 connecting the rectangular portion 612 and the frame-like portion 614; the first metal film 620 includes the first drive wirings 552 and the wiring 554; a second polyimide film 630 has a rectangular portion 632 and a frame-like portion 634 surrounding the rectangular portion 632; the second metal film 640 includes the second drive wirings 562 and the wiring 564; and the third polyimide film 650 has a rectangular portion 652, a frame-like portion 654 surrounding the rectangular portion 652 and mesh-like portions 656 connecting the rectangular portion 652 and the frame-like portion 654.

The mesh-like portions 616 of the first polyimide film 610 and the mesh-like portions 656 of the third polyimide film 650 constitute the first elastic member 534 and the second elastic member 544.

Ends of the first drive wirings 552 on the side opposite to the wiring 554 are electrically connected to the selection circuit formed on the frame-like portion 604 of the silicon substrate 600 through contact holes 618 formed on the frame-like portion 614 of the first polyimide film 610. Further, ends of the second drive wirings 562 on the side opposite to the wiring 564 are electrically connected to the selection circuit formed on the frame-like portion 604 of the silicon substrate 600 through contact holes 618 formed on the frame-like portion 614 of the first polyimide film 610 and contact holes 638 formed on the frame-like portion 634 of the second polyimide film 630.

As shown in FIG. 28, the opposed substrate 504 has four electrodes 574 arranged as a lattice. The four electrodes 574 are aligned along the first rotational axis $L_1$ and the second rotational axis $L_2$. That is, the four electrodes 574 are respectively positioned in four areas partitioned by the first rotational axis $L_1$ and the second rotational axis $L_2$. In accordance with this, as shown in FIG. 27, the movable plate 522 has four electrodes 572 that face the four electrodes 574 of the opposed substrate 506. These electrodes 572 and electrodes 574 constitute four pairs of opposed electrodes for detecting an electrostatic capacity, which varies depending on angle of rotation of the movable plate 522, in order to detect the angles of rotation about the two axes of the movable plate 522, namely, directions.

Furthermore, the opposed substrate 506 has four electrostatic capacity detection circuits 576, and each of them is respectively electrically connected with the electrode 574 for detecting the electrostatic capacity and wirings 668 for electrical connection with an external device as shown inn FIG. 27.

The opposed substrate 506 is manufactured by applying a semiconductor manufacture technique with the silicon substrate 662 as a start wafer, for example. The electrostatic capacity detection circuit 576 is monolithically formed on the silicon substrate 662. The electrodes 574 and the wirings 668 are insulated from the silicon substrate 662 by an insulating film 664 such as a silicon oxide film, and electrically connected to the electrostatic capacity detection circuit 576 through contact holes 666 formed in the insulating film 664. The electrodes 574 and the wirings 668 are covered with a passivation film 670 consisting of a silicon oxide film and the like.

In the optical deflector 500 according to this embodiment, like the first embodiment, the movable plate 522 is allowed to rotate about the first rotational axis $L_1$ and the second rotational axis $L_2$ at a desired angle by appropriately providing currents to the first drive wirings 552 and the second drive wirings 562. The angle of rotation of the movable plate 522 is controlled by changing the number of the drive wirings through which the drive current is caused to flow by a digital circuit, such as a CMOS circuit, constituting the selection circuit 568. As a result, a light beam reflected by the reflecting surface 524 of the movable plate 522 can be directed in a desired direction.

Since the current flowing through one of the first and second drive wirings produces a drive force to rotate the movable plate about the corresponding rotational axis but does not generate a drive force to rotate the movable plate about the other rotational axis, the crosstalk between the rotational operations corresponding to the respective rotational axes can be reduced.

In addition, the direction or the rotational angle of the movable plate 522 can be detected in real time by monitoring the electrostatic capacity between the electrodes 572 of the movable plate 522 and the electrodes 574 of the opposed substrate 506, which are opposed to each other.

Description will now be given as to detection of the angle of rotation of the movable plate 522 about one axis based on the electrostatic capacity with reference to FIG. 29. Detection of the angle of rotation about one axis which will be described below can be independently applied to the first rotational axis $L_1$ and the second rotational axis $L_2$, which are orthogonal to each other. That is, the angles of rotation of the movable plate 522 about the first rotational axis $L_1$ and the second rotational axis $L_2$, namely, the direction of the movable plate 522 can be detected by applying detection of the angle of rotation about one axis described below to each of the first rotational axis $L_1$ and the second rotational axis $L_2$.

Figure 29:
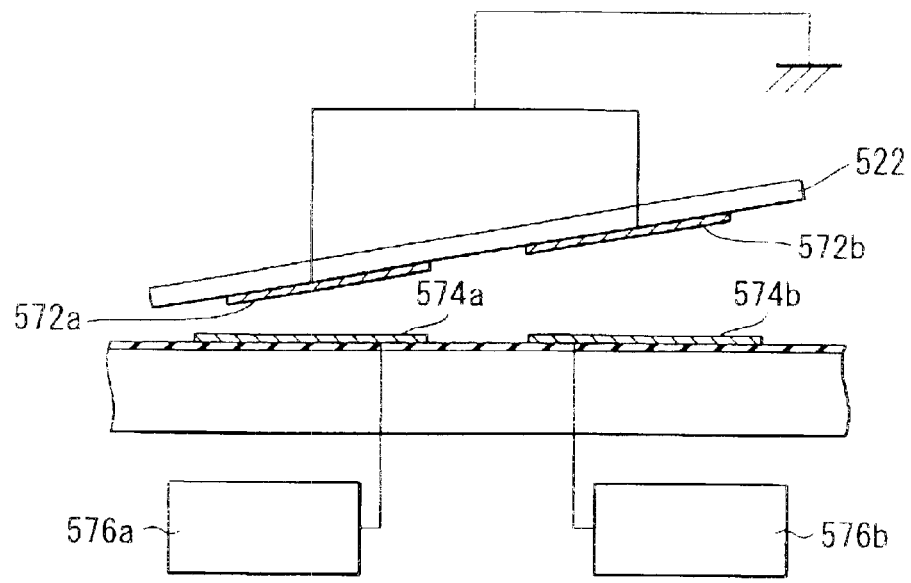
FIG. 29 is a view for illustrating detection of a rotational angle about one axis of the movable plate based on an electrostatic capacity.
Figure 30:
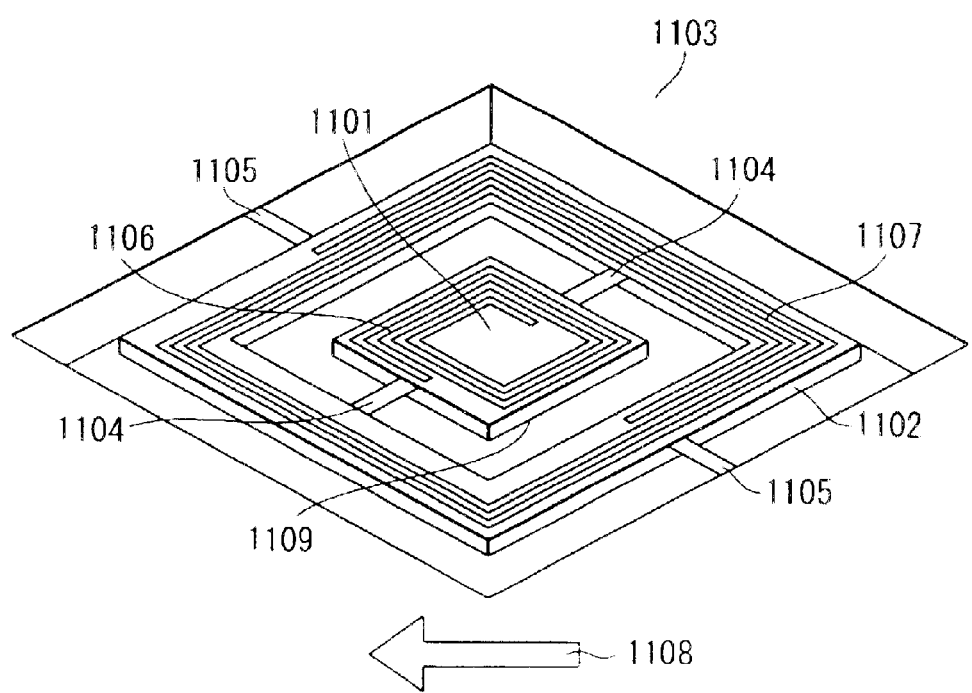
FIG. 30 shows a deflecting mirror element having a gimbal structure used in a prior art optical deflector.
Figure 31:
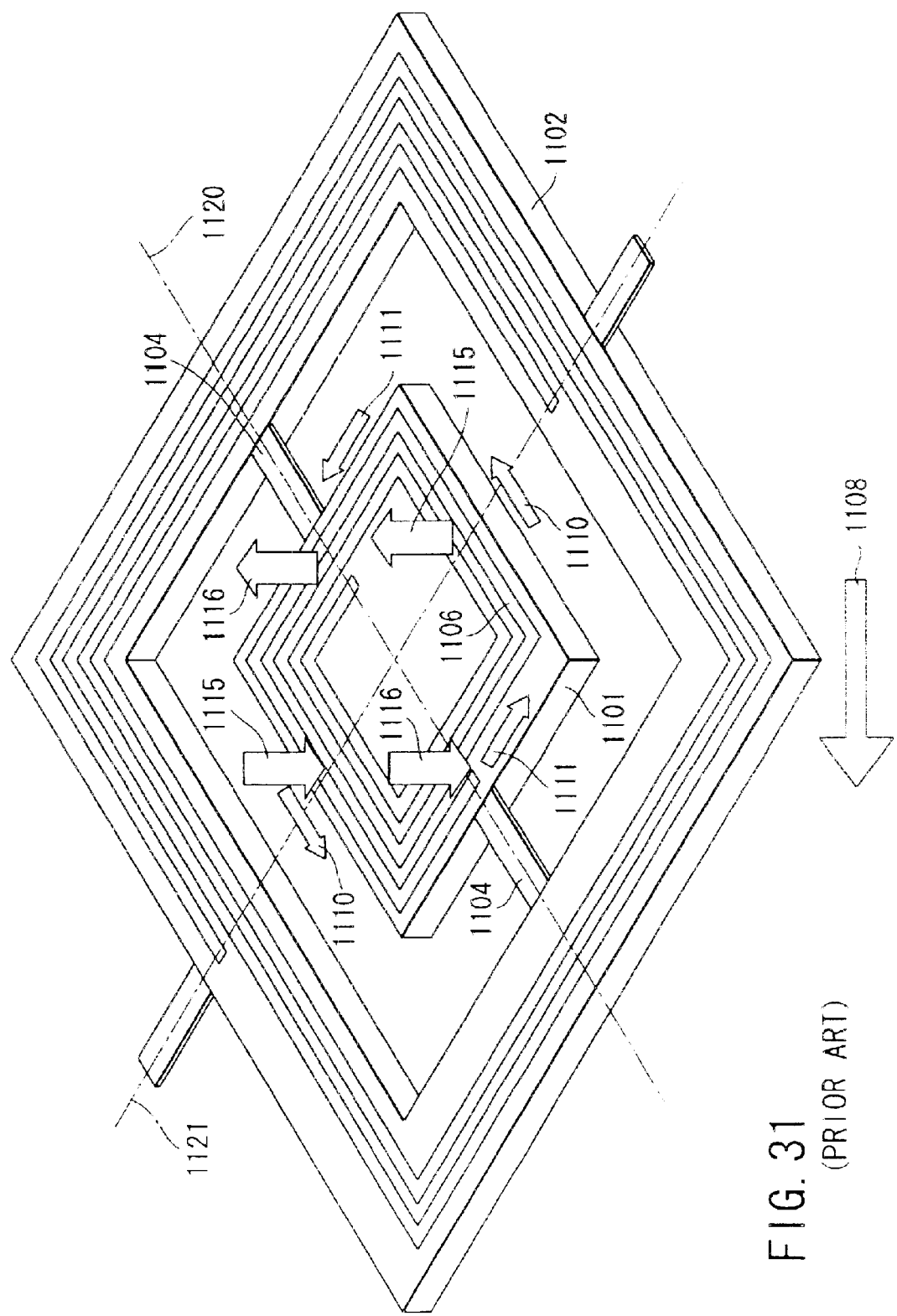
FIG. 31 is a view for illustrating the crosstalk generated in the optical deflector having the deflecting mirror element with the gimbal structure depicted in FIG. 30.

In FIG. 29, when the movable plate 522 rotates about the rotational axis perpendicular to the plane of the page of FIG. 29, a gap between a pair of the opposed electrodes positioned on one side relative to the rotational axis, e.g., the left side, namely, a gap between the electrode 572a and the electrode 574a becomes small, and a gap between the other pair of the opposed electrodes positioned on the opposite side relative to the rotational axis, namely, the right side, i.e., the electrodes 572b and the electrode 574b becomes large. Since the electrostatic capacity between the electrodes is in inverse proportion to the gap of the electrodes, the electrostatic capacity between the electrode 572a and the electrode 574a is detected by the capacity detection circuit 576a while the electrostatic capacity between the electrode 572b and the electrode 574b is detected by the capacity detection circuit 576b, and the both capacities are compared. As a result, a ratio of the gaps of the two pairs of the opposed electrodes, namely, the angle of rotation of the movable plate 522 can be detected in real time.

By subjecting the magnitude of the drive current to feedback control by utilizing information of the thus detected angle of rotation of the movable plate 522, i.e., by digitally controlling the number of the drive wirings through which the drive current is caused to flow, the angle of rotation of the movable plate 522 can be controlled with high accuracy.

The deflecting mirror element 510 according to this embodiment is produced by a manufacturing method that is substantially the same as the first embodiment. Different points will now be described hereinafter. After the process corresponding to FIG. 8, the selection circuit 568 is formed. In the process corresponding to FIG. 10, the first polyimide film 610 is formed, and then the contact holes 618 shown in FIG. 28 are formed. In the process corresponding to FIG. 11, the second polyimide film 630 is formed, and then the contact holes 638 shown in FIG. 28 are formed. In the process corresponding to FIG. 13, the electrode 572 are formed at a part which will become the movable plate 522, and then the etching mask of the polyimide film is formed. Thereafter, the deflecting mirror element 510 is brought to completion by going through the processes equal to those in FIGS. 15 to 17.

The deflecting mirror element array 502 having the deflecting mirror elements 510 formed in this manner is joined to the opposed substrate 506 on which the electrodes 574 or the capacity detection circuit 576 is previously formed through the spacers 508 with the electrodes 572 and the electrodes 574 being opposed to each other. The thus produced structure is finally combined with the permanent magnets 504, thereby completing the optical deflector 500.

Various modifications or changes may be made to this embodiment, as in the first embodiment, without departing from the scope of the present invention.

The element structure of the mesh structure of the elastic members 534 and 544 is a rectangle or a rhombus, but the present invention is not limited to, and other arbitrary shape, such as other polygon, a circle or an ellipse, may be adopted. Although the mesh structure consists of one type of element structure in this embodiment, it may be constituted by a combination of element structures having different dimensions or shapes.

Moreover, although the elastic members 534 and 544 are entirely configured by the mesh structure, the present invention is not restricted thereto, and they may be configured to partially have the mesh structure. That is, like FIG. 18, each of the elastic members 534 and 544 may comprise a mesh structure part and a plate-like part.

In addition, any other insulating material, such as a silicon oxide film or a silicon nitride film, may be used in place of the second polyimide film 630.

Additionally, each of the polyimide films 610, 630 and 650 may be substituted by a film consisting of any other arbitrary elastic material having an insulating property, such as silicone resin or parylene.

Further, like FIG. 19, each of the elastic members 534 and 544 may comprise a plate-like elastic material and zigzag wiring portions formed in the plate-like material in place of having the mesh structure.

Furthermore, like FIG. 20, each of the elastic members 534 and 544 may comprise an elastic material having the periodic bending structure and wirings linearly extending in the elastic material in the longitudinal direction.

Moreover, like FIG. 21, each of the elastic members 534 and 544 may comprise one elastic member having a mesh structure and zigzag wiring portions or wiring portions comprising successive rhombuses as a chain that are formed in the elastic member and extend near the edges on both sides.

Moreover, as in the first embodiment, each of the drive wirings may be formed in a shape like a coil to control the direction of the movable plate by changing the magnitude of the current flowing the drive wiring.

In addition, although the capacity detection circuit 576 is formed in the opposed substrate 506 in this embodiment, it may be formed in the movable plate 522 or the support body 512. In this case, the opposed electrodes 574 are grounded and the opposed electrodes 572 are connected to the capacity detection circuit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An optical deflector comprising:
   a support body;
   a movable plate having a reflecting surface to reflect a light beam;
   a pair of first elastic portions, which are elastically deformable, connecting the movable plate and the support body to allow the movable plate to rotate about a first rotational axis;
   a pair of second elastic portions, which are elastically deformable, connecting the movable plate and the support body to allow the movable plate to rotate about a second rotational axis orthogonal to the first rotational axis;
   a first drive wiring, which allows a current to flow through it, extending through the support body, the first elastic portions and the movable plate, the first drive wiring including parts that are positioned in the movable plate and extend only in parallel with the first rotational axis;
   a second drive wiring, which allows a current to flow through it, extending through the support body, the second elastic portions and the movable plate, the second drive wiring including parts that are positioned in the movable plate and extend only in parallel with the second rotational axis orthogonal to the first drive wiring parts on the movable plate; and
   a magnetic field generator that generates a magnetic field in a space surrounding the movable plate, the magnetic field interacting with the currents flowing through the first drive wiring and the second drive wiring on the movable plate to cause the movable plate to rotate, so that a direction of the light beam reflected by the reflecting surface of the movable plate is changed.

2. The optical deflector according to claim 1, wherein the magnetic field generator generates a magnetic field that has a direction with an angle of 45° with respect to the first rotational axis and the second rotational axis.

3. The optical deflector according to claim 1, wherein the part of the first drive wiring positioned in the movable plate is located line-symmetrically with the first rotational axis, and the part of the second drive wiring positioned in the movable plate is located line-symmetrically with the second rotational axis.

4. The optical deflector according to claim 1, wherein the first drive wiring comprises a single wiring and the second drive wiring comprises a single wiring.

5. The optical deflector according to claim 1, wherein the first drive wiring comprises wirings, the second drive wiring comprises wirings, and the optical deflector further includes selection circuits to select at least one wiring through which a current is caused to flow.

6. The optical deflector according to claim 1, wherein the elastic portions partially have a mesh structure.

7. The optical deflector according to claim 1, wherein the elastic portions entirely have a mesh structure.

8. The optical deflector according to claim 1, wherein the first drive wiring includes parts that are positioned in the elastic portions, extend in zigzags, and are located line-symmetrically with the first rotational axis, and the second drive wiring includes parts that are positioned in the elastic portions, extend in zigzags, and are located line-symmetrically with the second rotational axis.

9. An electromagnetic actuator comprising:
   a support body;
   a movable plate;
   a pair of first elastic portions, which are elastically deformable, connecting the movable plate and the support body along a first axis;
   a pair of second elastic portions, which are elastically deformable, connecting the movable plate and the support body along a second axis orthogonal to the first axis;
   a first drive wiring, which allows a current to flow through it, extending through the support body, the first elastic portion and the movable plate, the first drive wiring including parts that are positioned in the movable plate and extend only in parallel with the first axis;
   a second drive wiring, which allows a current to flow through it, extending through the support body, the second elastic portion and the movable plate, the second drive wiring including parts that are positioned in the movable plate and extend only in parallel with the second axis orthogonal to the first drive wiring parts on the movable plate; and
   a magnetic field generator that generates a magnetic field in a space surrounding the movable plate, the magnetic field interacting with the currents flowing through the first drive wiring and the second drive wiring on the movable plate.

10. An optical deflector comprising:
    a support body;
    a movable plate having a reflecting surface to reflect a light beam;
    a pair of first elastic portions, which are elastically deformable, connecting the movable plate and the support body to allow the movable plate to rotate about a first rotational axis, the pair of first elastic portions comprises a plurality of first elastic members extending along the first rotational axis;
    a pair of second elastic portions, which are elastically deformable, connecting the movable plate and the support body to allow the movable plate to rotate about a second rotational axis orthogonal to the first rotational axis, the pair of second elastic portions comprises a plurality of second elastic members extending along the second rotational axis;

a first drive wiring, which allows a current to flow through it, extending through the support body, the first elastic portions and the movable plate, the first drive wiring including parts that are positioned in the movable plate and extend in parallel with the first rotational axis;

a second drive wiring, which allows a current to flow through it, extending through the support body, the second elastic portions and the movable plate, the second drive wiring including parts that are positioned in the movable plate and extend in parallel with the second rotational axis orthogonal to the first drive wiring parts on the movable plate; and a magnetic field generator that generates a magnetic field in a space surrounding the movable plate, the magnetic field interacting with the currents flowing through the first drive wiring and the second drive wiring on the movable plate to cause the movable plate to rotate, so that a direction of the light beam reflected by the reflecting surface of the movable plate is changed.

11. The optical deflector according to claim 10, wherein the plurality of first elastic members are arranged symmetrical with respect to the first rotational axis.

12. The optical deflector according to claim 10, wherein the plurality of second elastic members are arranged symmetrical with respect to the second rotational axis.

* * * * *